United States Patent
Qi et al.

(10) Patent No.: US 10,148,558 B2
(45) Date of Patent: Dec. 4, 2018

(54) APPARATUS, SYSTEM AND METHOD OF ESTABLISHING A MESH DATA PATH BETWEEN NEIGHBOR AWARENESS NETWORKING (NAN) DEVICES

(71) Applicant: INTEL IP CORPORATION, Santa Clara, CA (US)

(72) Inventors: Emily H. Qi, Gig Harbor, WA (US); Po-Kai Huang, San Jose, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 2 days.

(21) Appl. No.: 15/393,321

(22) Filed: Dec. 29, 2016

(65) Prior Publication Data

US 2017/0353381 A1    Dec. 7, 2017

Related U.S. Application Data

(60) Provisional application No. 62/346,192, filed on Jun. 6, 2016.

(51) Int. Cl.
*H04L 12/721* (2013.01)
*H04W 8/00* (2009.01)
(Continued)

(52) U.S. Cl.
CPC ............ *H04L 45/26* (2013.01); *H04L 45/026* (2013.01); *H04W 8/005* (2013.01); *H04W 48/08* (2013.01); *H04W 84/12* (2013.01)

(58) Field of Classification Search
CPC ....... H04L 45/74; H04L 45/38; H04L 45/745; H04L 43/0852; H04L 43/00; H04L 45/64; H04L 43/08; H04L 43/10; H04L 49/00; H04L 47/00; H04L 67/00; H04L 5/00; H04L 5/003; H04L 2209/00;
(Continued)

(56) References Cited

U.S. PATENT DOCUMENTS

| | | | |
|---|---|---|---|
| 2015/0109961 A1* | 4/2015 | Patil ..................... | H04W 4/206 370/254 |
| 2015/0109981 A1* | 4/2015 | Patil .................... | H04L 67/1078 370/311 |

(Continued)

OTHER PUBLICATIONS

Wi-Fi Neighbour Awareness Networking (NAN), Technical Specification, Version 1.0, May 1, 2015, 98 pages.

*Primary Examiner* — Jung Liu
(74) *Attorney, Agent, or Firm* — Shichrur & Co.

(57) ABSTRACT

Some demonstrative embodiments include apparatuses, systems and/or methods of establishing a mesh data path. For example, a first Neighbor Awareness Networking (NAN) device may be configured to transmit a NAN data path request to a second NAN device to request to establish a NAN data path between the first NAN device and the second NAN device, the NAN data path request including a first path information attribute corresponding to a mesh data path; and to process a NAN data path response from the second NAN device, the NAN data path response including a second path information attribute corresponding to the mesh data path, the second path information attribute including a path status indicator to indicate whether mesh data path routing to the destination address of the mesh data path is successful.

25 Claims, 7 Drawing Sheets

(51) Int. Cl.
*H04W 48/08* (2009.01)
*H04L 12/751* (2013.01)
*H04W 84/12* (2009.01)

(58) Field of Classification Search
CPC ... H04L 63/0428; H04L 63/04; H04L 63/065; H04L 61/6018; H04L 2209/24; H04L 61/20; H04W 68/00; H04W 68/005; H04W 74/00; H04W 40/24; H04W 40/00; H04W 72/0446; H04W 74/04; H04W 72/0453; H04W 12/00; H04W 12/02; H04W 72/04; H04W 84/00; Y02D 70/22
See application file for complete search history.

(56) References Cited

U.S. PATENT DOCUMENTS

| | | | |
|---|---|---|---|
| 2015/0350866 A1* | 12/2015 | Patil | H04W 8/005 370/254 |
| 2016/0014669 A1* | 1/2016 | Patil | H04W 40/246 370/329 |
| 2016/0073330 A1* | 3/2016 | Patil | H04L 61/2015 709/220 |
| 2016/0174136 A1* | 6/2016 | Patil | H04L 12/18 370/312 |

* cited by examiner

US 10,148,558 B2

APPARATUS, SYSTEM AND METHOD OF ESTABLISHING A MESH DATA PATH BETWEEN NEIGHBOR AWARENESS NETWORKING (NAN) DEVICES

CROSS REFERENCE

This application claims the benefit of and priority from U.S. Provisional Patent Application No. 62/346,192 entitled "APPARATUS, SYSTEM AND METHOD OF ESTABLISHING A MESH DATA PATH OVER A NAN DATA PATH", filed Jun. 6, 2016, the entire disclosure of which is incorporated herein by reference.

TECHNICAL FIELD

Embodiments described herein generally relate to establishing a mesh data path.

BACKGROUND

Awareness networking, for example, according to a Wi-Fi Aware Specification, may enable wireless devices, for example, Wi-Fi devices, to perform device/service discovery, e.g., in their close proximity.

The awareness networking may include forming a cluster, e.g., a Wi-Fi Aware cluster, for devices in proximity. Devices in the same Wi-Fi Aware cluster may be configured to follow the same time schedule, e.g., a discovery window (DW), for example, to facilitate cluster formation and/or to achieve low power operation.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
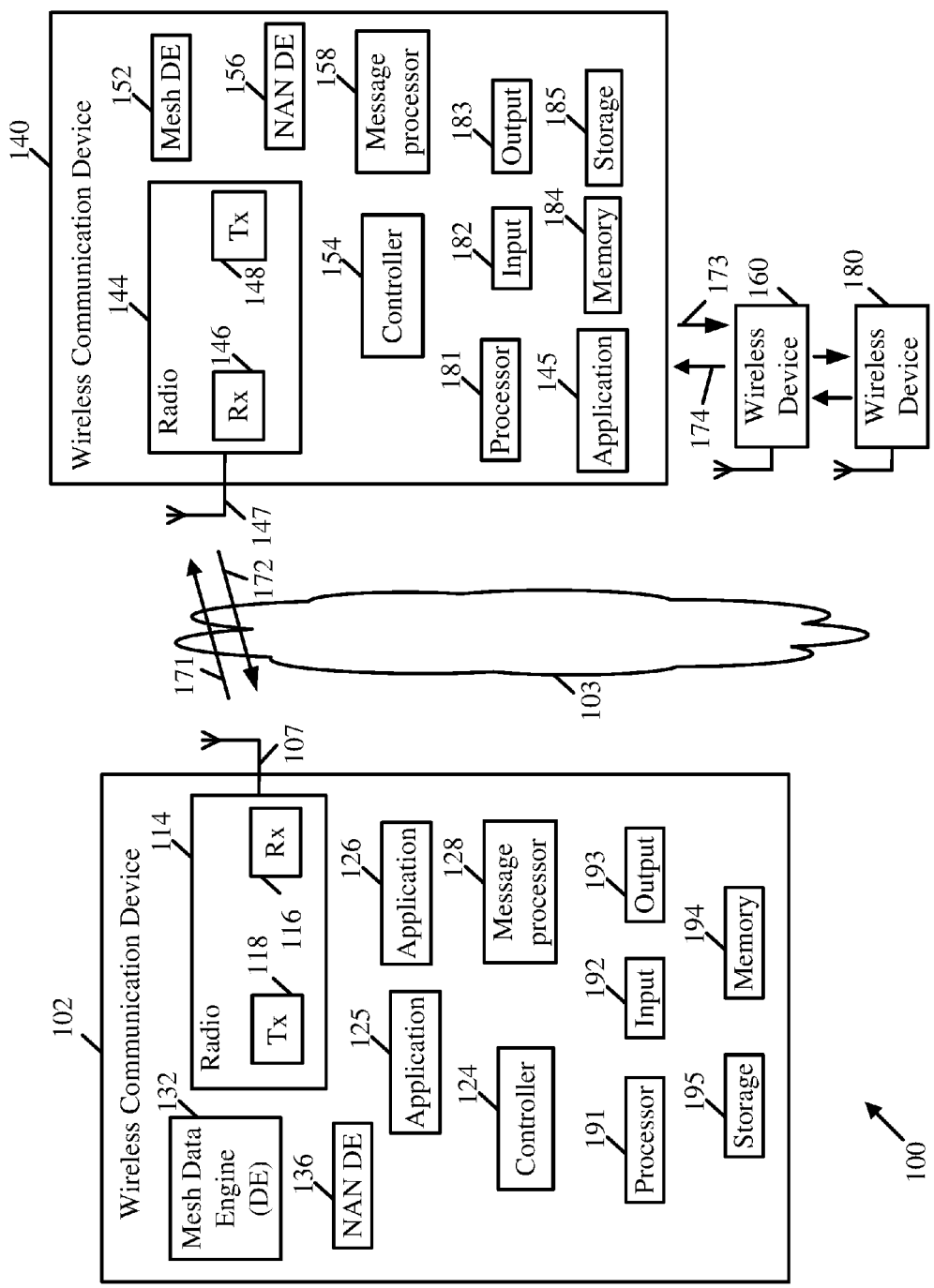
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc, indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc, to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing (WiFi) Alliance (WFA) Specifications (including Wi-Fi Neighbor Awareness Networking (NAN) Technical Specification, Version 1.0, May 1, 2015) and/or future versions and/or derivatives thereof, devices and/or networks operating in accordance with existing WFA Peer-to-Peer (P2P) specifications (WiFi P2P technical specification, version 1.5, Aug. 4, 2014) and/or future versions and/or derivatives thereof, devices and/or networks operating in accordance with existing IEEE 802.11 standards (including IEEE 802.11-2012 (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012); IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems— Local and Metropolitan Area Networks—Specific Requirements—Part 11: Wireless LAN Medium Access Control (MAC) and Physical Layer (PHY) Specifications—Amendment 3: Enhancements for Very High Throughput in the 60

GHz Band", 28 Dec. 2012); IEEE-802.11REVmc ("IEEE 802.11-REVmc™/D6.0, June 2016, draft standard for Information technology—Telecommunications and information exchange between systems Local and metropolitan area networks Specific requirements; Part 11: Wireless LAN Medium Access Control (MAC) and Physical Layer (PHY) Specification"); IEEE 802.11ax (IEEE 802.11ax, High Efficiency WLAN (HEW)); IEEE 802.11ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., including wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, device 102 may include at least one STA, and/or device 140 may include at least one STA.

In some demonstrative embodiments, devices 102, 140, 160 and/or 180 may include, operate as, and/or perform the functionality of one or more WLAN STAs.

In some demonstrative embodiments, devices 102, 140, 160 and/or 180 may include, operate as, and/or perform the functionality of one or more Wi-Fi STAs.

In some demonstrative embodiments, devices 102, 140, 160 and/or 180 may include, operate as, and/or perform the functionality of one or more Bluetooth (BT) devices.

In some demonstrative embodiments, devices 102, 140, 160 and/or 180 may include, operate as, and/or perform the functionality of one or more Neighbor Awareness Networking (NAN) STAs.

In some demonstrative embodiments, devices 102, 140, 160 and/or 180 may include, operate as, and/or perform the functionality of one or more location measurement STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, devices 102, 140, 160 and/or 180 may include, operate as, and/or perform the functionality of any other devices and/or STAs.

In some demonstrative embodiments, devices 102, 140, 160 and/or 180 may be configured to operate as, and/or to perform the functionality of, an access point (AP) STA.

In some demonstrative embodiments, devices 102, 140, 160 and/or 180 may be configured to operate as, and/or to perform the functionality of, a non-AP STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In one example, device 102 may be configured to operate as, and/or to perform the functionality of an AP STA, and/or device 140 may be configured to operate as, and/or to perform the functionality of a non-AP STA.

In some demonstrative embodiments, device 102 may include, for example, one or more of a processor 191, an input unit 192, an output unit 193, a memory unit 194, and/or a storage unit 195; and/or devices 140, 160 and/or 180 may include, for example, one or more of a processor 181, an input unit 182, an output unit 183, a memory unit 184, and/or a storage unit 185. Devices 102, 140, 160 and/or 180 may optionally include other suitable hardware components and/or software components. In some demonstrative embodiments, some or all of the components of one or more of devices 102, 140, 160 and/or 180 may be enclosed in a common housing or packaging, and may be interconnected or operably associated using one or more wired or wireless links. In other embodiments, components of one or more of devices 102, 140, 160 and/or 180 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, devices 102, 140, 160 and/or 180 may include one or more radios including circuitry and/or logic to perform wireless communication between devices 102, 140, 160, 180 and/or one or more other wireless communication devices. For example, device 102 may include at least one radio 114, and/or device 140 may include at least one radio 144.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at lest one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102, 140, 160 and/or 180 may form, and/or may communicate as part of, a wireless local area network (WLAN).

In some demonstrative embodiments, wireless communication devices 102, 140, 160 and/or 180 may form, and/or may communicate as part of, a WiFi network.

In some demonstrative embodiments, wireless communication devices 102, 140, 160 and/or 180 may form, and/or may communicate as part of, a WiFi Direct (WFD) network, e.g., a WiFi direct services (WFDS) network, and/or may operate as and/or perform the functionality of one or more WFD devices.

In one example, wireless communication devices 102, 140, 160 and/or 180 may include, may operate as, and/or may perform the functionality of a WiFi Direct device.

In some demonstrative embodiments, wireless communication devices 102, 140, 160 and/or 180 may be capable of performing awareness networking communications, for example, according to an awareness protocol, e.g., a WiFi aware protocol, and/or any other protocol, e.g., as described below.

In some demonstrative embodiments, wireless communication devices 102, 140, 160 and/or 180 may be capable of forming, and/or communicating as part of, a Neighbor Awareness Networking (NAN) network, e.g., a WiFi NAN or WiFi Aware network, and/or may perform the functionality of one or more NAN devices ("WiFi aware devices").

Some demonstrative embodiments are described herein with respect to one or more NAN devices communicating as part of a NAN network, e.g., a NAN cluster. However, embodiments are not limited to these demonstrative embodiments, and other embodiments may be implemented with respect to any other type of devices and/or STAs communicating as part of any other group, service set, and/or network.

In some demonstrative embodiments, wireless communication medium 103 may include a direct link, for example, a PTP link, e.g., a WiFi direct P2P link or any other PTP link, for example, to enable direct communication between wireless communication devices 102, 140, 160 and/or 180.

In some demonstrative embodiments, wireless communication devices 102, 140, 160 and/or 180 may operate as and/or perform the functionality of WFD P2P devices. For example, devices 102, 140, 160 and/or 180 may be able to operate as and/or perform the functionality of a P2P client device, and/or P2P group Owner (GO) device.

In other embodiments, wireless communication devices 102, 140, 160 and/or 180 may form, and/or communicate as part of, any other network, and/or may perform the functionality of any other wireless devices or stations.

In some demonstrative embodiments, devices 102, 140, 160 and/or 180 may include one or more applications configured to provide, to share, and/or to use one or more services, e.g., a social application, a file sharing application, a media application and/or the like, for example, using an awareness network, NAN network ("WiFi Aware network"), a PTP network, a P2P network, WFD network, or any other network.

In some demonstrative embodiments, device 102 may execute an application 125 and/or an application 126. In some demonstrative embodiments, device 140 may execute an application 145.

In some demonstrative embodiments, devices 102, 140, 160 and/or 180 may be capable of sharing, showing, sending, transferring, printing, outputting, providing, synchronizing, and/or exchanging content, data, and/or information, e.g., between applications and/or services of devices 102, 140, 160 and/or 180 and/or one or more other devices.

In some demonstrative embodiments, devices 102, 140, 160 and/or 180 may include a controller configured to control one or more operations and/or functionalities of devices 102, 140, 160 and/or 180, for example, one or more operations and/or functionalities of communication, e.g., awareness networking communications, WiFi Aware (NAN) communication and/or any other communication, between devices 102, 140, 160 and/or 180 and/or other devices, and/or any other functionality, e.g., as described below.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160, 180 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, controller 124 may perform one or more one or more operations and/or functionalities of, and/or may cause device 102 to perform one or more operations and/or functionalities of, a NAN engine, e.g., a NAN Discovery Engine (DE), for example to process one or more service queries and/or responses, e.g., from applications and/or services on devices 102 and/or 140, and/or one or more other devices.

In some demonstrative embodiments, controller 154 may perform one or more one or more operations and/or functionalities of, and/or may cause device 140 to perform one or more operations and/or functionalities of, a NAN engine, e.g., a NAN Discovery Engine (DE), for example to process one or more service queries and/or responses, e.g., from applications and/or services on devices 102 and/or 140, and/or one or more other devices.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, controllers 124 and/or 154, and/or message processors 128 and/or 158 may perform one or more operations and/or functionalities of, and/or may cause a STA to perform one or more operations and/or functionalities of, a NAN MAC, which may be configured to generate, process and/or handle one or more NAN messages, e.g., NAN Beacon frames and/or NAN Service Discovery Frames (SDFs).

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124, radio 114, and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In some demonstrative embodiments, at least part of the functionality of message processor 158 may be implemented as part of radio 144.

In some demonstrative embodiments, at least part of the functionality of message processor 158 may be implemented as part of controller 154.

In other embodiments, the functionality of message processor 158 may be implemented as part of any other element of device 140.

In some demonstrative embodiments, at least part of the functionality of controller 154, radio 144, and/or message processor 158 may be implemented by an integrated circuit, for example, a chip, e.g., a System in Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In some demonstrative embodiments, devices 102, 140, 160 and/or 180 may operate as and/or perform the functionality of a device or station, for example, an awareness networking device, a NAN device, a WiFi device, a WiFi Aware device, a WFD device, a WLAN device, a Low Power Long Range (LPLR) device, and/or any other device, capable of discovering other devices according to a discovery protocol and/or scheme.

In some demonstrative embodiments, radios 114 and/or 144 may communicate over wireless communication medium 103 according to an awareness networking scheme, for example, a discovery scheme, for example, a WiFi Aware discovery scheme ("NAN discovery scheme"), and/or any other awareness networking and/or discovery scheme, e.g., as described below.

In some demonstrative embodiments, the awareness networking scheme, e.g., NAN, may enable applications to discover services in their close proximity. For example, the NAN technology may be a low power service discovery, which may, for example, scale efficiently, e.g., in dense Wi-Fi environments.

In some demonstrative embodiments, a device, e.g., one or more of wireless communication devices 102, 140, 160 and/or 180, may include one or more blocks and/or entities to perform network awareness functionality. For example, a device, e.g., one or more of devices 102, 140, 160 and/or 180, may be capable of performing the functionality of a NAN device, which may include a NAN MAC and/or a Discovery Engine (DE). In one example, controllers 124 and/or 154 may be configured to perform the functionality of the discovery engine, and/or message processors 128 and/or 158 may be configured to perform the functionality of the NAN MAC, e.g., as described above. In another example, the functionality of the NAN MAC and/or the Discovery engine may be performed by any other element and/or entity of devices 102, 140, 160 and/or 180.

In some demonstrative embodiments, the awareness networking scheme may include a discovery scheme or protocol, e.g., as described below.

In some demonstrative embodiments, devices 102, 140, 160 and/or 180 may perform a discovery process according to the awareness networking scheme, for example, to discover each other and/or to establish a wireless communication link, e.g., a directional and/or high throughput wireless communication link and/or any other link.

In some demonstrative embodiments, devices 102, 140, 160 and/or 180 may be configured to enable time synchronization between devices 102, 140, 160, 180 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., devices 102, 140, 160 and/or 180, so that STAs can find each other more efficiently during a DW.

In some demonstrative embodiments, devices of an awareness network, e.g., a NAN network, may form one or more clusters, e.g., in order to publish and/or subscribe for services. A NAN cluster may be defined by an Anchor Master (AM) (also referred to as a "NAN master device" or "anchor device"). In one example, the AM may include a NAN device, which has the highest rank in the NAN cluster.

In some demonstrative embodiments, NAN data exchange may be reflected by discovery frames, e.g., Publish, Subscribe and/or Follow-Up Service discovery frames (SDF). These frames may include action frames, which may be sent by a device that wishes to publish a service/application, and/or to subscribe to a published service/application at another end.

In one example, one of devices 102, 140, 160 and/or 180, e.g., device 102, may operate as and/or perform the functionality of an AM. The AM may be configured to transmit one or more beacons. Another one of devices 102, 140, 160 and/or 180, e.g., device 140, may be configured to receive and process the beacons.

In one example, devices 102, 140, 160 and/or 180 may operate as and/or perform the functionality of NAN devices, e.g., belonging to a NAN cluster, which may share a common set of NAN parameters, for example, including a common NAN timestamp, and/or a common time period between consecutive discovery windows (DWs). The NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, devices 102, 140, 160 and/or 180 may be configured to discover one another over a predefined communication channel ("the social channel"). In one example, the Channel 6 in the 2.4 GHz band may be defined as the NAN social channel. Any other additional or alternative channel may be used as the social channel.

In some demonstrative embodiments, devices 102, 140, 160 and/or 180 may transmit discovery frames, e.g., SDFs, during the plurality of DWs, e.g., over the social channel and/or any other channel, which may be used for discovery. For example the NAN AM may advertize the time of the DW, during which NAN devices may exchange SDFs.

In one example, devices 102, 140, 160 and/or 180 may transmit the discovery frames to discover each other, for example, to enable using the one or more services provided by applications 125, 126 and/or 145.

In some demonstrative embodiments, devices 102, 140, 160 and/or 180 may communicate during a DW according to a contention mechanism. For example, devices 102, 140, 160 and/or 180 may check whether or not a channel is unoccupied prior to an attempt to transmit a discovery frame during the discovery window.

In some demonstrative embodiments, a device of devices 102, 140, 160 and/or 180, e.g., device 102, may not transmit the discovery frame during the DW, e.g., if the channel is occupied. In some demonstrative embodiments, for example, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of frame.

In some demonstrative embodiments, the discovery frame may not require an acknowledgement frame. According to these embodiments, a transmitter of the discovery frame may not backoff a transmission of the discovery frame.

In some demonstrative embodiments, the discovery frame transmitted by device 102 during the DW may be configured to enable other devices or services that are running on other devices to discover the services on device 102.

In some demonstrative embodiments, devices of system 100 may utilize availability information, e.g., in the form of an Availability Interval Bitmap and/or Further Availability Map, for example, to allow a device of devices 102, 140, 160 and/or 180, to advertise its availability, for example, in terms of at least one channel and one or more timeslots, during which the device may be available, e.g., active ("awake"), for example, to perform post NAN activities.

In one example, the availability information may be communicated as part of an Availability Attribute, e.g., including a 32-bit bitmap for 32 timeslots, for example, wherein each timeslot is 16 milliseconds (ms) long. For example, each bit that is not zero may represent a timeslot, during which a device sending the Availability Attribute is to be awake and available to send and/or receive data in a specified method. In another example, the availability information may include any other additional or alternative information, and/or may be communicated and/or formatted in any other manner.

In some demonstrative embodiments, devices 102, 140, 160 and/or 180 may be part of an awareness cluster, e.g., a NAN cluster.

In some demonstrative embodiments, devices 102, 140, 160 and/or 180 may form the NAN cluster.

In some demonstrative embodiments, devices 102, 140, 160 and/or 180 may be configured to communicate according to a Wi-Fi Aware specification and/or any other awareness networking specification, which may be configured to allow a group of devices to discover other devices/services nearby and/or in close proximity, e.g., with low power.

In some demonstrative embodiments, devices 102, 140, 160 and/or 180 may form the NAN cluster and may synchronize to the same clock, e.g., as described above.

In one example, all devices of the NAN cluster, may converge on a time period and channel, e.g., one or more DWs, to facilitate the discovery of services of devices 102, 140, 160 and/or 180, and/or to achieve low power consumption, e.g., as described above.

In some demonstrative embodiments, devices 102, 140, 160 and/or 180 may be configured to utilize NAN as a power efficient, and/or scalable, peer to peer technology, for example, to enable Wi-Fi devices to discover devices and/or services in their close proximity, and/or to setup one or more data paths with one or more peer devices.

For example, devices 102, 140, 160 and/or 180 may be configured to form a NAN cluster for devices in proximity, and devices in the same NAN cluster may follow the same awake time schedule, e.g., the same DWs, to facilitate cluster formation and/or achieve low power operation, e.g., as described above.

In some demonstrative embodiments, devices 102, 140, 160 and/or 180 may transmit NAN Service Discovery frames, for example, during the DWs, e.g., to publish services that the devices are interested or provide and/or to subscribe to one or more published services, e.g., as described above.

In some demonstrative embodiments, when a desired service is discovered, two NAN devices may set up a peer to peer NAN Data Path (NDP), for example, over a NAN Data Link (NDL) between the two NAN devices, which may enable to transmit data packets between the two NAN devices.

Figure 2:
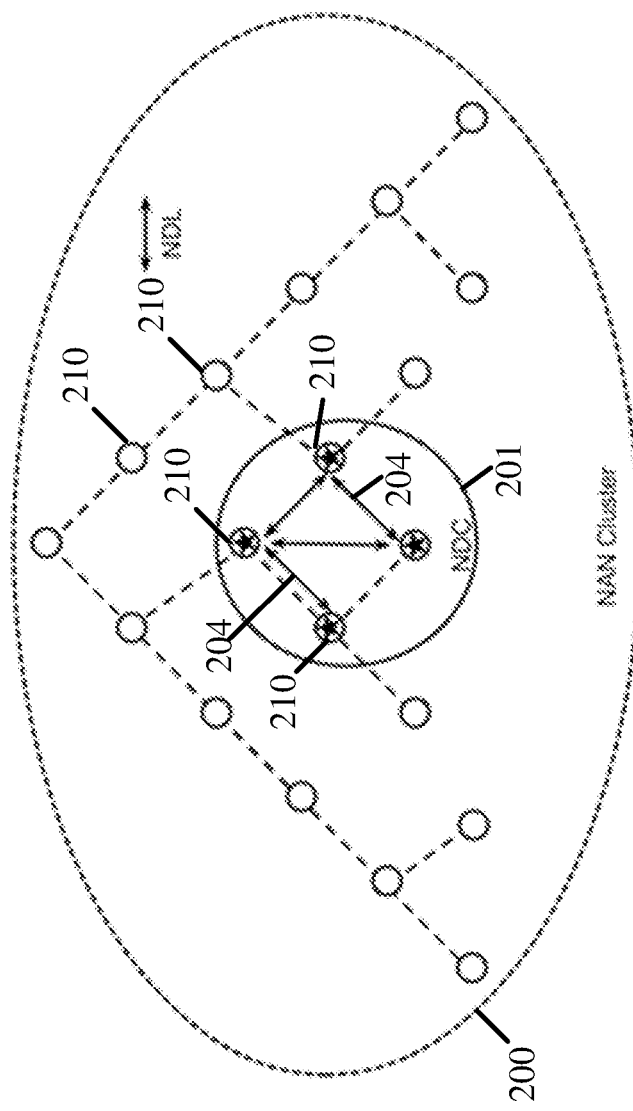
FIG. 2 is a schematic illustration of a Neighbor Awareness Networking (NAN) data cluster, which may be implemented in accordance with some demonstrative embodiments.

Reference is made to FIG. 2, which schematically illustrates a NAN Data Cluster (NDC) 201, which may be implemented in accordance with some demonstrative embodiments.

In some demonstrative embodiments, as shown in FIG. 2, a NAN cluster 201 may be formed between a plurality of NAN devices 210 belonging to the same NAN cluster 200.

In some demonstrative embodiments, as shown in FIG. 2, one or more NDLs 204 may be formed between a plurality of NAN devices 210, e.g., of the NDC 201.

In some demonstrative embodiments, one or more NDPs may be formed over NDLs 204, for example, to communicate data between the one or more NAN devices 210 of the NDC 201.

Referring back to FIG. 1, in some demonstrative embodiments, devices 102, 140, 160 and/or 180 may be configured to be able to communicate, for example, even in deployments and/or scenarios, which require an extended network range. For example, as Internet of Things (IoT) applications increase, there is a strong desire to extend the range of the network and forward the data packets to edging devices, for example, by building a mesh network.

In some demonstrative embodiments, devices 102, 140, 160 and/or 180 may be configured to utilize a NAN service discovery mechanism, for example, to carry control messages of an upper layer routing protocol, for example, even without establishing and/or maintaining a data link, e.g., a layer 2 link.

In some demonstrative embodiments, devices 102, 140, 160 and/or 180 may be configured to utilize the NAN service discovery, for example, for mesh path discovery, and/or for building a routing table of the routing protocol (also referred to as "mesh protocol").

In some demonstrative embodiments, a data path setup in NAN for a route discovered by a mesh path discovery protocol may be slow. For example, if a device wants to send a data packet to a destination through a route discovered by the mesh protocol, the device may need to complete a data path setup with a next hop, for example, before requesting the next hop to establish a following data path towards the destination of the mesh path. This procedure may waste resources, for example, since the data path setup may fail in the middle of the route, while devices along the route, e.g., before the failing point, may still need to maintain scheduling resources of the already established NAN data paths, which may eventually not be used. Additionally, this procedure may slow down the data path setup through the route to the destination, e.g., since a device may be required to wait for completing establishment of a NAN data path with a previous device along the mesh route, for example, before proceeding to establish a NAN data path with a next device along the mesh route.

In some demonstrative embodiments, devices 102, 140, 160 and/or 180 may be configured to implement a mesh data path setup mechanism, which may enable, for example, to achieve at least a technical advantage of accelerating a setup process of building a mesh network, e.g., a mesh path, over a NAN data path, and/or a technical advantage of enabling, for example, a device to maintain scheduling resources, for example, only if a data path setup through the route is successful, e.g., as described below.

In some demonstrative embodiments, the mesh data path setup mechanism may allow, for example, a technical advantage of leveraging the more energy efficient and robust NAN Data Path to establish data links between devices, e.g., as described below.

In some demonstrative embodiments, the mesh data path setup mechanism may provide, for example, a technical advantage of an accelerated setup process, which may be, for example, power efficient, for a mesh routing protocol, e.g., as described below.

In some demonstrative embodiments, the mesh data path setup mechanism may be implemented with any suitable routing protocol, for example, to exchange messages, construct and/or maintain routing tables, e.g., in a power efficient manner. Accordingly, the mesh data path setup mechanism may provide a technical advantage and/or may solve a technical problem of avoiding a need to define a new routing protocol.

In some demonstrative embodiments, devices 102, 140, 160 and/or 180 may be configured to operate as, perform the functionality of, perform the role of, and/or perform one or more operations of a NAN Mesh device, e.g., as described below.

In some demonstrative embodiments, a NAN mesh device may include a Mesh Data Engine, and a NAN Data Engine, e.g., as described below.

In some demonstrative embodiments, devices 102, 140, 160 and/or 180 may include a Mesh Data Engine and a NAN Data Engine.

For example, device 102 may include a mesh data engine 132, and a NAN data engine 136; and/or device 140 may include a mesh data engine 152, and a NAN data engine 156.

In some demonstrative embodiments, controller 124 and/or message processor 128 may be configured to perform one or more operations, roles, and/or functionalities of a NAN mesh device, Mesh data engine 132 and/or a NAN data engine 136.

In some demonstrative embodiments, controller 154 and/or message processor 158 may be configured to perform one or more operations, roles, and/or functionalities of a NAN mesh device, Mesh data engine 152 and/or a NAN data engine 156.

In some demonstrative embodiments, NAN data engines 132 and/or 152 may include a layer 2 function, which may be configured to establish peer to peer connectivity, for example, according to a NAN discovery scheme and/or protocol, e.g., as described above.

In some demonstrative embodiments, mesh data engines 134 and/or 156 may be implemented as higher layer functionality, for example, a layer 2+ or a layer 3 functionality, and/or any other layer, which may be configured to establish a mesh data path, for example, in the layer 2, for example, using a routing table in the layer 3.

In some demonstrative embodiments, the routing table may be generated according to any suitable routing protocol, for example, an internet Protocol (IP) version 6 (IPv6) Routing Protocol, e.g., an IPv6 Routing Protocol for Low power and Lossy Networks (RPL), and/or any other additional or alternative routing protocol.

In some demonstrative embodiments, a mesh data path may be established, for example, when there are one or more data packets to be transmitted through a route, e.g., a route discovered by layer 3 routing functionality.

In some demonstrative embodiments, device 102 may have one or more data packets to be transmitted to a destination device 180, for example, through a mesh data path, for example, when device 102 may not be able to establish a direct path to device 180.

In some demonstrative embodiments, mesh data engine 132 may be configured to determine an address of a subsequent NAN device, which is subsequent to device 102 along a routing path of the mesh data path from device 102 to the destination device 180.

In some demonstrative embodiments, the mesh data engine 132 may be configured to determine the address of the subsequent NAN device, for example, based on routing information defining a routing path of the mesh data path between devices 102 and 180.

For example, the mesh data engine 132 may determine that device 140 is to be the next hop along the mesh data path, for example, based on the routing table.

In some demonstrative embodiments, the mesh data engine 132 may be configured to initiate a mesh data path request to the NAN data engine 136.

In some demonstrative embodiments, the mesh data engine 132 may be configured to generate the mesh data path request, for example, based on the routing information defining the routing path of the mesh data path to destination device 180.

In some demonstrative embodiments, the mesh data path request may include mesh data path information (also referred to as "Path Specific Information") corresponding to the mesh data path to be established, e.g., as described below.

In some demonstrative embodiments, the mesh data path request may include a path identifier (ID) corresponding to the mesh data path to be established.

In some demonstrative embodiments, the mesh data path request may include a source address of the mesh data path, for example, an address, e.g., a Medium Access Control (MAC) address, of device 102.

In some demonstrative embodiments, the mesh data path request may include a destination address of the mesh data path, for example, an address, e.g., a MAC address, of device 180.

In some demonstrative embodiments, the mesh data path request may include the subsequent device along the routing path, for example, an address, e.g., a MAC address, of device 140.

In some demonstrative embodiments, the mesh data path request may include any other additional and/or alternative elements and/or information.

In some demonstrative embodiments, NAN data engine 136 may be configured to establish a NAN data path with the next hop, for example, device 140, e.g., according to the address of the subsequent device identified by the mesh data path request, for example, by exchanging a NAN data path request frame and a NAN data path response frame with device 140, e.g., as described below.

In some demonstrative embodiments, device 102 may transmit a NAN Data Path (NDP) request 171 to the subsequent device along the routing path, e.g., device 140, for example, to request to establish a NAN data path between devices 102 and 140.

In some demonstrative embodiments, controller 124 may be configured to control cause, and/or trigger device 102 to transmit the NAN data path request 171 to device 140 to request to establish a NAN data path between devices 102 and 140.

In some demonstrative embodiments, NAN data engine 136 may be configured to generate the NAN data path request 171, for example, based on the mesh data path request from mesh data engine 132.

In some demonstrative embodiments, the mesh data path request may include the address of device 140, for example, if device 140 is the next hop along the mesh data path to the destination device 180.

In some demonstrative embodiments, controller 124 may be configured to control cause, and/or trigger device 102 to determine the address of device 140, for example, based on the routing information corresponding to the destination address of the mesh data path, e.g., an address of device 180.

In some demonstrative embodiments, the NAN data path request 171 may include a path information attribute corresponding to the mesh data path.

In some demonstrative embodiments, the path information attribute of request 171 may include, or may be in the form of, a path specific information attribute, e.g., as described below. In other embodiments, the path information attribute may be communicated as part of any other type of message, information element, and/or attribute.

In some demonstrative embodiments, the path information attribute of request 171 may include a source address of the mesh data path, e.g., the address of device 102.

In some demonstrative embodiments, the path information attribute of request 171 may include a destination address of the mesh data path, e.g., the address of device 180.

In some demonstrative embodiments, the path information attribute of request 171 may include the path ID of the mesh data path.

In some demonstrative embodiments, device 102 may wait, e.g., after the transmission of the NAN data path request 171 to device 140, for a response from device 140, for example, in order to determine whether or not to complete to establish the NAN data path between devices 102 and 140 e.g., as described below.

In some demonstrative embodiments, device 140 may receive NAN data path request 171 from device 102.

In some demonstrative embodiments, device 140 may be configured to transmit a NAN data path response 172 to device 102, e.g., as described below.

In some demonstrative embodiments, device 102 may be configured to process the NAN data path response 172 from device 140, e.g., as described below.

In some demonstrative embodiments, NAN data path response 172 may include a path information attribute corresponding to the mesh data path, e.g., as described below.

In some demonstrative embodiments, the path information attribute of NDP response 172 may include, or may be in the form of, the path specific information attribute, e.g., as described below. In other embodiments, the path information attribute of NDP response 172 may be communicated as part of any other type of message, information element, and/or attribute.

In some demonstrative embodiments, the path information attribute of NDP response 172 may include the source address of the mesh data path, e.g., the address of device 102.

In some demonstrative embodiments, the path information attribute of NDP response 172 may include the destination address of the mesh data path, e.g., the address of device 180.

In some demonstrative embodiments, the path information attribute of NDP response 172 may include the path ID of the mesh data path.

In some demonstrative embodiments, the path information attribute of NDP response 172 may include a path status indicator, which may be configured to indicate whether mesh data path routing to the destination address of the mesh data path is successful, e.g., as described below.

In some demonstrative embodiments, controller 124 may be configured to control cause, and/or trigger device 102 to select whether to complete establishing the NAN data path between devices 102 and 140, for example, based at least on the path status indicator of the NDP response 172, e.g., as described below.

In some demonstrative embodiments, controller 124 may be configured to control cause, and/or trigger device 102 to complete establishing the NAN data path between devices 102 and 140, for example, only when the path status indicator in NDP response 172 is to indicate that the mesh data path routing to the destination address of the mesh data path is successful, e.g., only when routing to device 180 is successful.

In some demonstrative embodiments, controller 124 may be configured to control cause, and/or trigger device 102 to terminate establishing the NAN data path devices 102 and 140, for example, when the path status indicator in NDP response 172 is to indicate that the mesh data path routing to the destination address of the mesh data path is not successful ("failed"), e.g., when routing to device 180 is not successful.

In some demonstrative embodiments, device 140 may be configured to set the path status indicator in the NAN data path response 172, e.g., to indicate whether or not the mesh data path routing to the destination address of the mesh data path is successful, e.g., as descried below.

In some demonstrative embodiments, controller 154 may be configured to control cause, and/or trigger device 140 to process the NAN data path request 171 from device 102 to request to establish the NAN data path between devices 102 and 140.

In some demonstrative embodiments, device 140 may be configured to attempt mesh data path routing to the destination address, for example, by attempting to establish a NAN data path with a next NAN device along the mesh data path, e.g., as described below.

In some demonstrative embodiments, controller 154 may be configured to control cause, and/or trigger device 140 to complete establishing the NAN data path between devices 102 and 140, for example, based at least on whether the mesh data path routing to the destination address of the mesh data path is successful, e.g., as descried below.

In some demonstrative embodiments, controller 154 may be configured to control cause, and/or trigger device 140 to complete establishing the NAN data path between devices 102 and 140, for example, only when the mesh data path routing to the destination address of the mesh data path is successful, e.g., as descried below.

In some demonstrative embodiments, controller 154 may be configured to control cause, and/or trigger device 140 to terminate establishing the NAN data path between devices 102 and 140, for example, when the mesh data path routing to the destination address of the mesh data path is not successful ("failed"), e.g., as described below.

In some demonstrative embodiments, controller 154 may be configured to control cause, and/or trigger device 140 to determine an address of a subsequent NAN device, e.g., device 160, to be used for the mesh data path, for example, based on routing information corresponding to the destination address of the mesh data path, e.g., as described below.

In some demonstrative embodiments, NAN data engine 156 may provide to mesh data engine 152 a mesh data path request indication, for example, based on the NAN data path request 171 from device 102 to request to establish the NAN data path between devices 102 and 140, e.g., as described below.

In some demonstrative embodiments, the mesh data path request indication may include the source address of the mesh data path, e.g., the address of device 102, and the destination address of the mesh data path, e.g., the address of device 180.

In one example, mesh data engine 152 may use the routing table, e.g., the routing table in layer 3, to determine the subsequent NAN device, e.g., device 160, which is subsequent to device 140 along the routing path of the mesh data path, and to initiate a data path setup with the subsequent NAN device.

In some demonstrative embodiments, a subsequent NAN device may be reached, or an alternative route to reach the destination may be available.

In some demonstrative embodiments, for example, if the subsequent NAN device cannot be reached, mesh data engine 152 may find an alternative route to reach the destination, for example, by using the routing table in the layer 3 routing functionality.

In some demonstrative embodiments, the alternative route to reach the destination, may not be available and/or there may be no alternative route to reach the destination.

In some demonstrative embodiments, controller 154 may be configured to control cause, and/or trigger device 140 to set the path status indicator in the second path information attribute of the NAN data path response 172 to indicate the mesh data path routing to the destination address of the mesh data path is not successful ("failed"), for example, when the subsequent NAN device, which is subsequent to device 140 along a routing path of the mesh data path, cannot be reached.

In some demonstrative embodiments, controller 154 may be configured to control cause, and/or trigger device 140 to set the path status indicator in the second path information attribute of in the NAN data path response 172 to indicate the mesh data path routing to the destination address of the mesh data path is not successful ("failed"), for example, when device 160 cannot be reached, or when a NAN data path response from the subsequent NAN device is not received, e.g., as described below.

In some demonstrative embodiments, mesh data engine 152 may send a mesh data path request to NAN data engine 156.

In some demonstrative embodiments, the mesh data path request may include an address of the subsequent NAN device, for example, an address, e.g., a MAC address, of device 160.

In some demonstrative embodiments, the NAN data engine 156 may generate a NAN data path request 173 to be transmitted to device 160, for example, based on the mesh data path request from the mesh data engine 152.

some demonstrative embodiments, controller 154 may be configured to control cause, and/or trigger device 140 to transmit to device 160 the NAN data path request 173 to request to establish a NAN data path between the devices 140 and 160.

some demonstrative embodiments, controller 154 may be configured to control cause, and/or trigger device 140 to transmit the NAN data path request 173 to device 160, for example, based on the NAN data path request 171 from device 102.

In some demonstrative embodiments, NAN data path request 173 may include a path information attribute corresponding to the mesh data path.

In some demonstrative embodiments, the path information attribute of request 173 may include, or may be in the form of, the path specific information attribute, e.g., as described below. In other embodiments, the path information attribute of NDP request 173 may be communicated as part of any other type of message, information element, and/or attribute.

In some demonstrative embodiments, the path information attribute of NDP request 173 may include the source address of the mesh data path, e.g., the address of device 102.

In some demonstrative embodiments, the path information attribute of NDP request 173 may include the destination address of the mesh data path, e.g., the address of device 180.

In some demonstrative embodiments, the path information attribute of NDP request 173 may include the path ID of the mesh data path.

In some demonstrative embodiments, device 140 may wait, e.g., after the transmission of the NAN data path request 173 to device 160, for a NAN data path response from device 160, for example, in order to determine whether or not to complete to establish the NAN data path between devices 102 and 140 and/or whether or not to complete to establish the NAN data path between devices 140 and 160, e.g., as described below.

In some demonstrative embodiments, device 140 may set the path status indicator in the path information attribute of response 172 from device 140 to device 102, for example, based on the NAN data path response from device 160.

some demonstrative embodiments, controller 154 may be configured to control cause, and/or trigger device 140 to set the path status indicator in the path information attribute of response 172 from device 140 to device 102, for example, to indicate the mesh data path routing to the destination address of the mesh data path is not successful ("failed"), e.g., when a NAN data path response from device 160 is not received.

In some demonstrative embodiments, device 140 may receive a NAN data path response 174 from device 160.

some demonstrative embodiments, controller 154 may be configured to control cause, and/or trigger device 140 to process the NAN data path response 174 from device 160.

In some demonstrative embodiments, NAN data path response 174 may include a path information attribute corresponding to the mesh data path.

In some demonstrative embodiments, the path information attribute of response 174 may include, or may be in the form of, the path specific information attribute, e.g., as described below. In other embodiments, the path information attribute of NDP response 174 may be communicated as part of any other type of message, information element, and/or attribute.

In some demonstrative embodiments, the path information attribute of NDP response 174 may include the source address of the mesh data path, e.g., the address of device 102.

In some demonstrative embodiments, the path information attribute of NDP response 174 may include the destination address of the mesh data path, e.g., the address of device 180.

In some demonstrative embodiments, the path information attribute of NDP response 174 may include the path ID of the mesh data path.

In some demonstrative embodiments, the path information attribute of NDP response 174 may include a path status indicator.

In some demonstrative embodiments, the path status indicator of NDP response 174 may be configured to indicate whether mesh data path routing to the destination address of the mesh data path is successful. For example, the path status indicator may be configured to indicate whether the mesh data path routing to device 180, e.g., by device 160, is successful.

In some demonstrative embodiments, device 140 may set the path status indicator in the path information attribute of response 172 from device 140 to device 102, for example, based on the path status indicator in the path information attribute of response 174 from device 160, e.g., as described below.

In some demonstrative embodiments, controller 154 may be configured to control cause, and/or trigger device 140 to set the path status indicator in the path information attribute of response 172 from device 140 to device 102, for example, based on the path status indicator in the path information attribute of response 174 from device 160.

some demonstrative embodiments, controller 154 may be configured to control cause, and/or trigger device 140 to set the path status indicator in the path information attribute of response 172 from device 140 to device 102, for example, to indicate the mesh data path routing to the destination address of the mesh data path is successful, e.g., when the path status indicator in the path information attribute of response 174 from device 160 is to indicate the mesh data path routing to the destination address of the mesh data path is successful.

For example, device 140 may set the path status indicator in the path information attribute of response 172 to indicate the mesh data path routing to the destination address of the mesh data path is successful, for example, if device 160 is successful in mesh data path routing to reach device 180.

In some demonstrative embodiments, controller 154 may be configured to control cause, and/or trigger device 140 to set the path status indicator in the path information attribute of response 172 from device 140 to device 102, for example, to indicate the mesh data path routing to the destination address of the mesh data path is not successful ("failed"), e.g., when the path status indicator in the path information attribute of response 174 from device 160 is to indicate the mesh data path routing to the destination address of the mesh data path is not successful ("failed").

For example, device 140 may set the path status indicator in the path information attribute of response 172 to indicate the mesh data path routing to the destination address of the mesh data path is not successful, for example, if device 160 fails to in mesh data path routing to reach device 180.

In some demonstrative embodiments, controller 154 may be configured to control cause, and/or trigger device 140 to set the path status indicator in the path information attribute of response 172 from device 140 to device 102, for example, to indicate the mesh data path routing to the destination address of the mesh data path is not successful ("failed"), e.g., when the device 160 cannot be reached, or when a NAN data path response from device 160 is not received.

For example, device 140 may set the path status indicator in the path information attribute of response 172 to indicate the mesh data path routing to the destination address of the mesh data path is not successful ("failed"), for example, if device 140 fails to reach device 160, or if a NAN data path response from device 160 is not received by device 140.

In some demonstrative embodiments, device 140 may transmit NAN data path response 172 to device 102, for example, after reception of response 174 from device 160. For example, controller 154 may be configured to control cause, and/or trigger device 140 to transmit response 172 to device 102, for example, only after receiving response 174 from device 160, only after determining that a subsequent NAN device along the mesh data path cannot be reached, or only after determining that a response from device 160 is not received for a predefined time.

IN some demonstrative embodiments, controller 154 may be configured to control cause, and/or trigger device 140 to transmit to device 102 the NDP response 172 including the path information attribute including the path status indicator.

In some demonstrative embodiments, device 102 may receive response 172 from device 102.

In some demonstrative embodiments, device 102 may determine whether or not to establish the NAN data path between devices 102 and 140, for example, based on the path status indicator in the path information attribute of response 172.

In some demonstrative embodiments, device 102 may complete to establish the NAN data path between devices 102 and 140, for example, if the path status indicator in the path information attribute of response 172 indicates mesh data path routing to device 180 is successful.

For example, device 102 may complete to establish the NAN data path between devices 102 and 140, for example, only if device 102 successfully establishes a NAN data path with device 140, device 140 successfully establishes a NAN data path device 160, and device 160 successfully establishes a NAN data path with device 180.

In some demonstrative embodiments, device 102 may terminate to establish the NAN data path between devices 102 and 140, for example, if the path status indicator in the path information attribute of response 172 indicates mesh data path routing to device 180 is not successful ("fail").

For example, device 102 may terminate establishing the NAN data path between devices 102 and 140, for example, when device 102 fails to establish a NAN data path with device 140, device 140 fails to establish a NAN data path with device 160, and/or device 160 fails to establish a NAN data path with device 180.

In some demonstrative embodiments, devices 102, 140, 160 and/or 180 may be configured to terminate a mesh data path, e.g., as described below.

In some demonstrative embodiments, a device of devices 102, 140, 160 and/or 180, e.g., device 102, may be configured to terminate the mesh data path, for example, if the mesh data path is idle for a termination threshold period, e.g., a maximal idle period. The termination threshold period may be, for example, preconfigured, negotiated, or dynamically adjusted.

In some demonstrative embodiments, a device of devices 102, 140, 160 and/or 180, e.g., device 102, may be configured to terminate the mesh data path, for example, for any other additional or alternative reason.

In one example, a data path termination message may be used for the mesh data path termination.

In some demonstrative embodiments, controller 124 may be configured to control cause, and/or trigger device 102 to transmit, e.g., to device 140, a termination message, for example, data path termination message, to terminate the mesh data path.

In some demonstrative embodiments, controller 124 may be configured to control cause, and/or trigger device 102 to transmit the termination message, for example, when the mesh data path is idle for a time period longer than the termination threshold period.

In some demonstrative embodiments, a device of a mesh data path, e.g., devices 102, 140, 160 and/or 180 may be configured to indicate to one or more other devices in the mesh data path, that the mesh data path is to be maintained, for example, to prevent termination of the mesh data path, e.g., as described below.

In some demonstrative embodiments, a device of devices 102, 140, 160 and/or 180, e.g., device 102, may be configured to maintain the mesh data path, for example, if the device wants to use the mesh that path and/or for any other reason.

In one example, a keep-alive message may be used, for example, for maintaining an indication of liveliness of the Mesh data path.

In some demonstrative embodiments, controller 124 may be configured to control cause, and/or trigger device 102 to transmit, e.g., to device 140, a keep-alive message to indicate that the mesh data path is to be maintained.

In some demonstrative embodiments, controller 124 may be configured to control cause, and/or trigger device 102 to transmit, e.g., to device 140, the keep-alive message, for example, if no communication has been performed over the mesh data path for a keep-alive period.

In some demonstrative embodiments, a device of devices 102, 140, 160 and/or 180, e.g., device 140, may be configured to select not to terminate the mesh data path, for example, if the device receives the keep-alive message to indicate that the mesh data path is to be maintained.

some demonstrative embodiments, controller 154 may be configured to control cause, and/or trigger device 140 to process a keep-alive message from device 102, for example, to indicate that the mesh data path is to be maintained.

In some demonstrative embodiments, the Path Specific Information attribute, e.g., including the path ID of the mesh data path, the source address the mesh data path, and/or the destination address the mesh data path, may be included, for example, as a sub-attribute, for example, in a Service Specific Info field of a Service Descriptor attribute. In other embodiments, the Path Specific Information attribute may be defined as a separate attribute, e.g., a Path Specific Info attribute, or may be included in any other field and/or attribute.

In some demonstrative embodiments, the Path Specific Information attribute may be included in a NAN Data Path Request frame, a NAN data path Response frame, and/or a NAN data path termination frame. For example, the Path Specific Information attribute may be included in NAN data path request 171, NAN data path request 173, NAN data path response 172, NAN data path response 174, and/or in one or more termination messages.

In some demonstrative embodiments, the Path Specific Information attribute (sub-attribute) may have a format including one or more fields, e.g., as follows:

TABLE 1

| Field | Size (octets) | Description |
| --- | --- | --- |
| Attribute ID or Sub Attribute ID | 1 | Identifies the type of Path Specific Information. |

TABLE 1-continued

| Field | Size (octets) | Description |
|---|---|---|
| Length | 1 or 2 | If it is attribute, the length is 2. If it is sub-attribute, the length is 1. |
| Path Status | 1 | For example:<br>0: request path setup for routing to the destination<br>1: indicate path setup failure for routing to the destination<br>2: indicate path setup success for routing to the destination<br>2-15: reserved |
| Mesh Path ID | 1 | Set to a nonzero value to identify a mesh path. (Only used if layer 3 decides a specific path denoted by the Path ID. Otherwise, set to 0, and the receiver of the attribute will find the path to destination.) |
| Source Address | 6 or 16 | Identify the source IP address of the mesh path. 6 octets for IPv4, and 16 octets for IPv6. |
| Destination Address | 6 or 16 | Identify the destination IP address of the mesh path. 6 octets for IPv4, and 16 octets for IPv6. |

In other embodiments, a path information attribute, for example, a Path specific information attribute may include some or all of the fields of Table 1, and/or may include one or more additional or alternative fields and/or elements, e.g., in addition to or instead of one or more of the fields or elements of Table 1.

Figure 3:
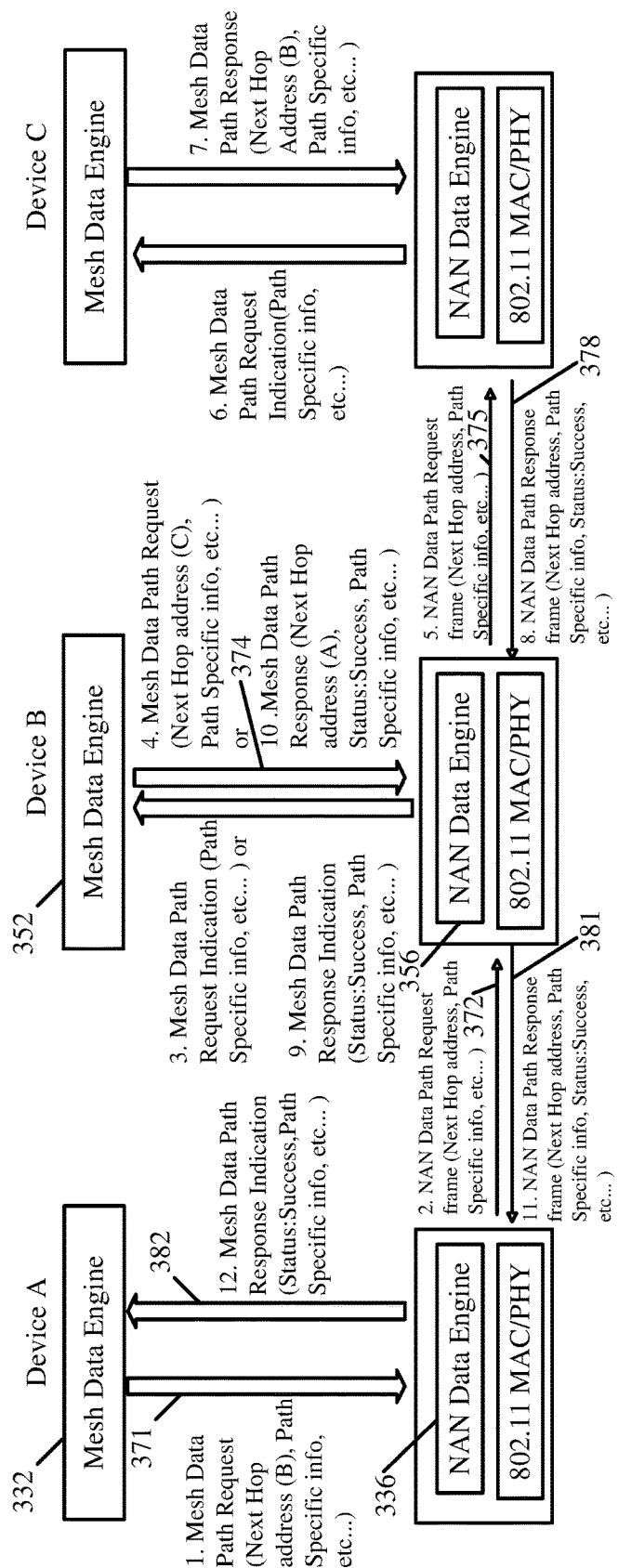
FIG. 3 is a schematic illustration of communications and operations of first, second and third NAN devices to establish a mesh data path, in accordance with some demonstrative embodiments.

Reference is made to FIG. 3, which schematically illustrates communications and operations of first, second and third NAN Devices to establish a mesh data path, in accordance with some demonstrative embodiments.

In some demonstrative embodiments, the first, second and third NAN Devices may include a first NAN device, denoted Device A, a second NAN device, denoted Device B, and/or a third NAN device, denoted Device C.

In some demonstrative embodiments, devices A, B and C may be configured to communicate messages of a mesh data path setup over a NAN data path, for example, to establish a mesh data path.

In one example, device 102 (FIG. 1) may be configured to operate as Device A, device 140 (FIG. 1) may be configured to operate as Device B, and/or device 160 (FIG. 1) may be configured to operate as Device C.

In some demonstrative embodiments, ah shown in FIG. 3, for example, a routing path for data transmission from the first device A to the third device C, may be determined, for example, to be via the second device B, e.g., the routing path may be Device A Device B Device C.

In some demonstrative embodiments, the routing path may be determined, for example, according to any suitable routing protocol, for example, according to a routing Table, e.g., as described above.

In some demonstrative embodiments, for example, when there is data traffic in Device A for Device C, a mesh data engine 332 of Device A may check the Destination address of Device C, and may decide that a subsequent device, e.g., the next hop, which is subsequent to device A along the routing path may be Device B, e.g., in order to reach the Device C.

In some demonstrative embodiments, mesh data engine 332 may determine the subsequent device, for example, based on routing information, e.g., including the routing path to Device C, as described above.

In some demonstrative embodiments, as shown in FIG. 3, mesh data engine 332 may send a mesh data path request 371 to a NAN data engine 336 of device A.

In some demonstrative embodiments, as shown in FIG. 3, mesh data path request 371 may include an address of the subsequent device, e.g., an address of Device B, and path specific information corresponding to the mesh data path, e.g., as described above.

In some demonstrative embodiments, as shown in FIG. 3, the NAN device A transmit to the NAN Device B a NAN data path request 372, for example, to request to set up a NAN data path between Device A and Device B.

In some demonstrative embodiments, NAN data engine 336 may generate the NAN data path request 372, for example, based on mesh data path request 371.

In some demonstrative embodiments, NAN data path request 372 may include an address of Device B, and a path specific information attribute including path specific information corresponding to the mesh path to be established, e.g., the mesh path from Device A to Device C. For example, the path specific information attribute may include a source address of the mesh path, e.g., an address of the Device A, and a destination address of the mesh path, e.g., an address of the Device C.

In some demonstrative embodiments, as shown in FIG. 3, Device B may receive the data path request 372 with the Path Specific information from Device A.

In some demonstrative embodiments, a mesh data engine 352 of Device B may determine the NAN device C as the next hop, for example, based on routing information corresponding to the destination address of the mesh path.

In one example, mesh data engine 352 of Device B may check the Destination address, may decide on a subsequent device to reach Device C, and may send a mesh data path request 374 to a NAN data engine 356 of device B.

In some demonstrative embodiments, as shown in FIG. 3, mesh data path request 374 may include an address of the subsequent device, e.g., an address of Device C, and path specific information corresponding to the mesh data path, e.g., as described above.

In some demonstrative embodiments, for example, if the Data Path Request from Device B cannot reach the next hop, e.g., Device C, the Device B may be configured to update a routing table to find route top reach the destination device, e.g., Device C.

In some demonstrative embodiments, for example, if Device B cannot find a routing to reach the Destination Device C, the Device B may send, e.g., to Device A, a Data Path Response, that rejects the data path setup, and indicates Mesh Data Path setup failure, for example, in the Path Specific Information attribute, e.g., as described below with reference to FIG. 4.

In some demonstrative embodiments, as shown in FIG. 3, the Device B may transmit a NAN data path request 375 to Device C.

In some demonstrative embodiments, NAN data engine 356 may generate the NAN data path request 375, for example, based on mesh data path request 374.

In some demonstrative embodiments, as shown in FIG. 3, NAN data path request 375 may include an address of Device C, and the path specific information attribute corresponding to the mesh path to be established.

In some demonstrative embodiments, as shown in FIG. 3, NAN data path request 375 may be received and processed by Device C.

In some demonstrative embodiments, as shown in FIG. 3, Device C may transmit a NAN data path response 378 to Device B.

In some demonstrative embodiments, as shown in FIG. 3, NAN data path response 378 may include the path specific information attribute including a path status indicator to indicate that the mesh data path routing to the destination address of the mesh data path is successful.

In some demonstrative embodiments, for example, as shown in FIG. 3, upon receipt of data path response 378 from the NAN device C including the path specific information attribute including the path status indicator to indicate that the mesh data path routing to the destination address of the mesh data path is successful, the Device B may transmit a data path response 381 to the NAN Device A.

In some demonstrative embodiments, as shown in FIG. 3, the data path response 381 may include the path specific information attribute including the path status indicator to indicate that the mesh data path routing to the destination address of the mesh data path is successful.

In some demonstrative embodiments, as shown in FIG. 3, Device A may receive NAN data path response 381 including the path status indicator to indicate that the mesh data path routing to the destination address of the mesh data path is successful, and may update (382) mesh data engine 332 of Device A that mesh data path routing to the destination address of the mesh data path is successful.

In some demonstrative embodiments, Device A may complete to establish the data path between devices A and B, for example, upon receipt of the response 381 with the indication that mesh data path routing to the destination address of the mesh data path is successful.

Figure 4:
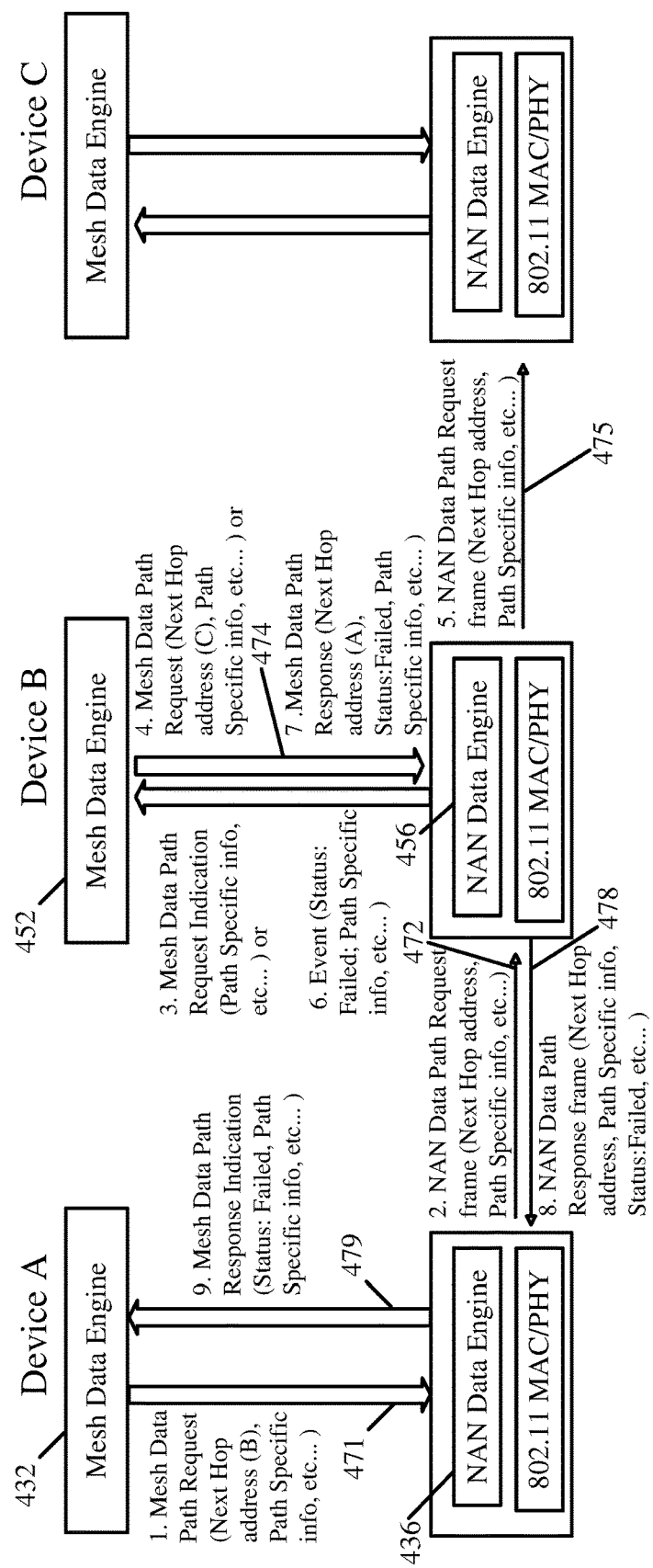
FIG. 4 is a schematic illustration of communications and operations of first, second and third NAN devices to attempt to establish a mesh data path, in accordance with some demonstrative embodiments.

In some demonstrative embodiments, if the Device B does not receive NAN data path response 375 from the NAN device C, or if NAN data path response 375 includes the path status indicator to indicate that the mesh data path routing to the destination address of the mesh data path is not successful, the Device B may transmit to the NAN device A NAN data path response including the path status indicator to indicate that the mesh data path routing to the destination address of the mesh data path is not successful, e.g., as described below with reference to FIG. 4.

Reference is made to FIG. 4, which schematically illustrates communications and operations of first, second and third NAN Devices to attempt to establish a mesh data path, in accordance with some demonstrative embodiments.

In some demonstrative embodiments, the first, second and third NAN Devices may include a first NAN device, denoted Device A, a second NAN device, denoted Device B, and/or a third NAN device, denoted Device C.

In some demonstrative embodiments, devices A, B and C may be configured to communicate messages of a mesh data path setup over a NAN data path, for example, to establish a mesh data path.

in one example, device 102 (FIG. 1) may be configured to operate as Device A, device 140 (FIG. 1) may be configured to operate as Device B, and/or device 160 (FIG. 1) may be configured to operate as Device C.

In some demonstrative embodiments, ah shown in FIG. 4, for example, a routing path for data transmission from the first device A to the third device C, may be determined, for example, to be via the second device B, e.g., the routing path may be Device A⇒ Device B⇒ Device C.

In some demonstrative embodiments, the routing path may be determined, for example, according to any suitable routing protocol, for example, according to a routing Table, e.g., as described above.

In some demonstrative embodiments, for example, when there is data traffic in Device A for Device C, a mesh data engine 432 of Device A may check the Destination address of Device C, and may decide that a subsequent device, e.g., the next hop, which is subsequent to device A along the routing path may be Device B, e.g., in order to reach the Device C.

In some demonstrative embodiments, mesh data engine 432 may determine the subsequent device, for example, based on routing information, e.g., including the routing path to the Device C, e.g., as described above.

In some demonstrative embodiments, as shown in FIG. 4, mesh data engine 432 may send a mesh data path request 471 to a NAN data engine 436 of device A.

In some demonstrative embodiments, as shown in FIG. 4, mesh data path request 471 may include an address of the subsequent device, e.g., an address of Device B, and path specific information corresponding to the mesh data path, e.g., as described above.

In some demonstrative embodiments, as shown in FIG. 4, the NAN device A transmit to the NAN Device B a NAN data path request 472, for example, to request to set up a NAN data path between Device A and Device B.

In some demonstrative embodiments, NAN data engine 436 may generate the NAN data path request 472, for example, based on mesh data path request 471.

In some demonstrative embodiments, NAN data path request 472 may include an address of Device B, and a path specific information attribute including path specific information corresponding to the mesh path to be established, e.g., the mesh path from Device A to Device C. For example, the path specific information attribute may include a source address of the mesh path, e.g., an address of the Device A, and a destination address of the mesh path, e.g., an address of the Device C.

In some demonstrative embodiments, as shown in FIG. 4, Device B may receive the data path request 472 with the Path Specific information from Device A.

In some demonstrative embodiments, a mesh data engine 452 of Device B may determine the NAN device C as the next hop, for example, based on routing information corresponding to the destination address of the mesh path.

In one example, mesh data engine 452 of Device B may check the Destination address, may decide on the a subsequent device to reach Device C, and may send a mesh data path request 474 to a NAN data engine 456 of device B.

In some demonstrative embodiments, as shown in FIG. 4, mesh data path request 474 may include an address of the subsequent device, e.g., an address of Device C, and path specific information corresponding to the mesh data path, e.g., as described above.

In some demonstrative embodiments, as shown in FIG. 4, the Device B may transmit a NAN data path request 475 to Device C.

In some demonstrative embodiments, NAN data engine 456 may generate the NAN data path request 475, for example, based on mesh data path request 474.

In some demonstrative embodiments, as shown in FIG. 4, NAN data path request 475 may include an address of Device C, and the path specific information attribute corresponding to the mesh path to be established.

In some demonstrative embodiments, for example, if the Data Path request 475 from Device B cannot reach the next hop, e.g., Device C, the Device B may be configured to update a routing table to find Device C.

In one example, if Device B cannot find a routing path to reach the Destination Device C, the Device B may send, e.g., to Device A, a Data Path Response 481, to reject the data path setup, and to indicate Mesh Data Path setup failure, e.g., in the Path Specific Information attribute.

In some demonstrative embodiments, as shown in FIG. 4, Device B may transmit the NAN data path response 481 to device A including the path status indicator to indicate that the mesh data path routing to the destination address of the mesh data path is not successful, for example, if the Device B does not receive a NAN data path response from the NAN device C, or if Device B cannot find a routing to reach the Destination C.

In some demonstrative embodiments, as shown in FIG. 4, device A may receive NAN data path response 481 including the path status indicator to indicate that the mesh data path routing to the destination address of the mesh data path is not successful, and may update (482) mesh data engine 432 of Device A that mesh data path routing to the destination address of the mesh data path is not successful.

In some demonstrative embodiments, Device A may select not to complete to establish the data path between devices A and B.

Figure 5:
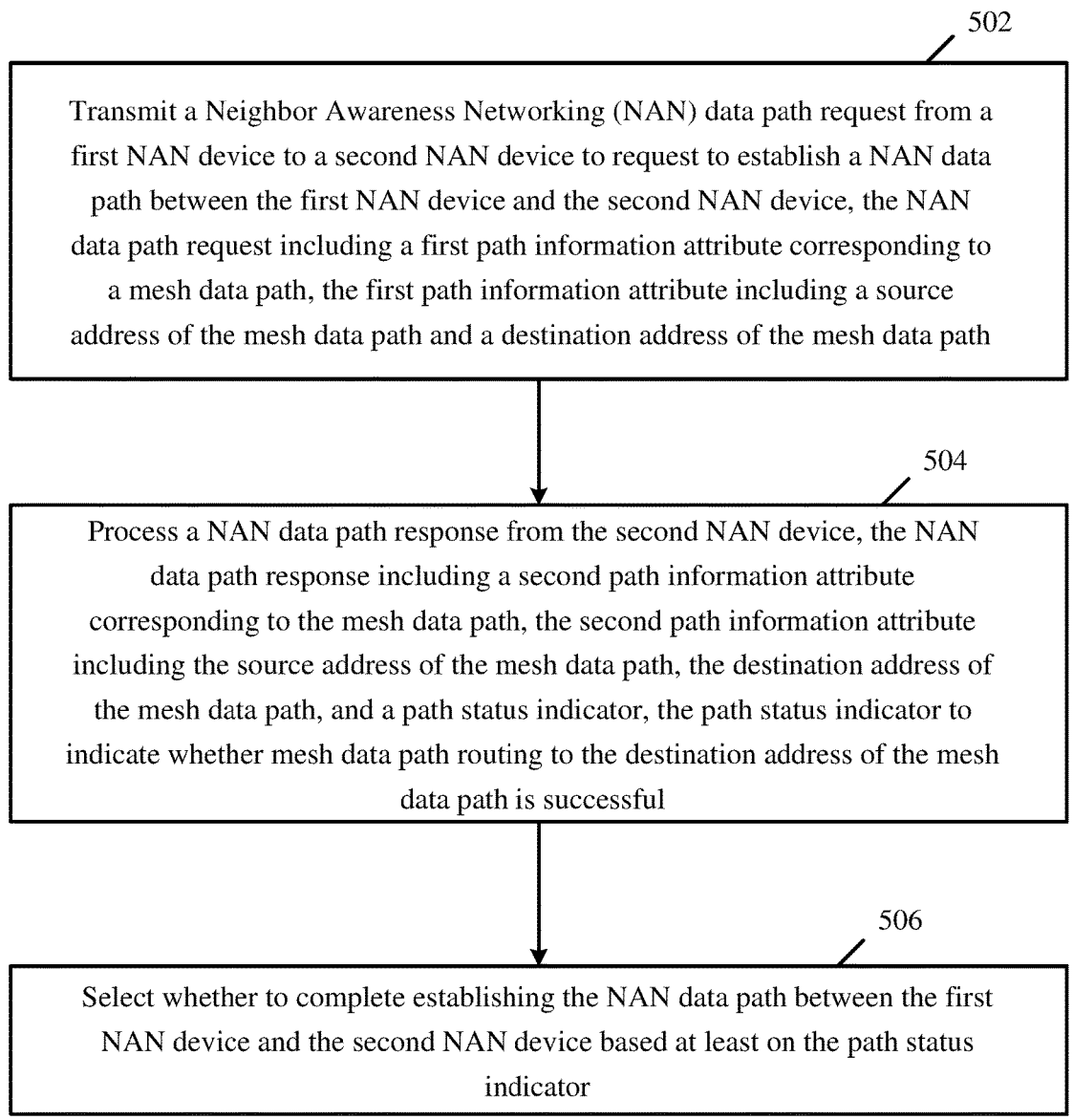
FIG. 5 is a schematic flow-chart illustration of a method of establishing a mesh data path, in accordance with some demonstrative embodiments.

Reference is made to FIG. 5, which schematically illustrates a method of establishing a mesh data path, in accordance with some demonstrative embodiments. For example, one or more of the operations of FIG. 5 may be performed by one or more elements of a system, system 100 (FIG. 1); a device, e.g., wireless communication devices 102, 160, 180 and/or 140 (FIG. 1); a controller, e.g., controller 124 (FIG. 1), and/or controller 154 (FIG. 1); a radio, e.g., radio 114 (FIG. 1), and/or radio 144 (FIG. 1); a message processor, e.g., message processor 128 (FIG. 1), and/or message processor 158 (FIG. 1); a mesh data engine, e.g., mesh data engines 132 and/or 152 (FIG. 1); and/or a NAN data engine, e.g., NAN data engines 136 and/or 156 (FIG. 1).

As indicated at block 502, the method may include transmitting from a first NAN device a NAN data path request to a second NAN device to request to establish a NAN data path between the first NAN device and the second NAN device, the NAN data path request including a first path information attribute corresponding to a mesh data path, the first path information attribute including a source address of the mesh data path and a destination address of the mesh data path. For example, controller 124 (FIG. 1) may control cause and/or trigger device 102 (FIG. 1) to transmit NAN data path request 171 (FIG. 1) including the first path information attribute corresponding to the mesh data path, the first path information attribute including the source address of the mesh data path and the destination address of the mesh data path, e.g., as described above.

As indicated at block 504, the method may include processing a NAN data path response from the second NAN device, the NAN data path response including a second path information attribute corresponding to the mesh data path, the second path information attribute including the source address of the mesh data path, the destination address of the mesh data path, and a path status indicator, the path status indicator to indicate whether mesh data path routing to the destination address of the mesh data path is successful. For example, controller 124 (FIG. 1) may control cause and/or trigger device 102 (FIG. 1) to process NAN data path response 172 (FIG. 1) including the path information attribute including the path status indicator to indicate whether mesh data path routing to the destination address of the mesh data path is successful, e.g., as described above.

As indicated at block 506, the method may include selecting whether to complete establishing the NAN data path between the first NAN device and the second NAN device based at least on the path status indicator. For example, controller 124 (FIG. 1) may control cause and/or trigger device 102 (FIG. 1) to select whether to complete establishing the NAN data path between devices 102 and 140 (FIG. 1), for example, based at least on the path status indicator in NAN data path response 172 (FIG. 1) from device 140 (FIG. 1), e.g., as described above.

Figure 6:
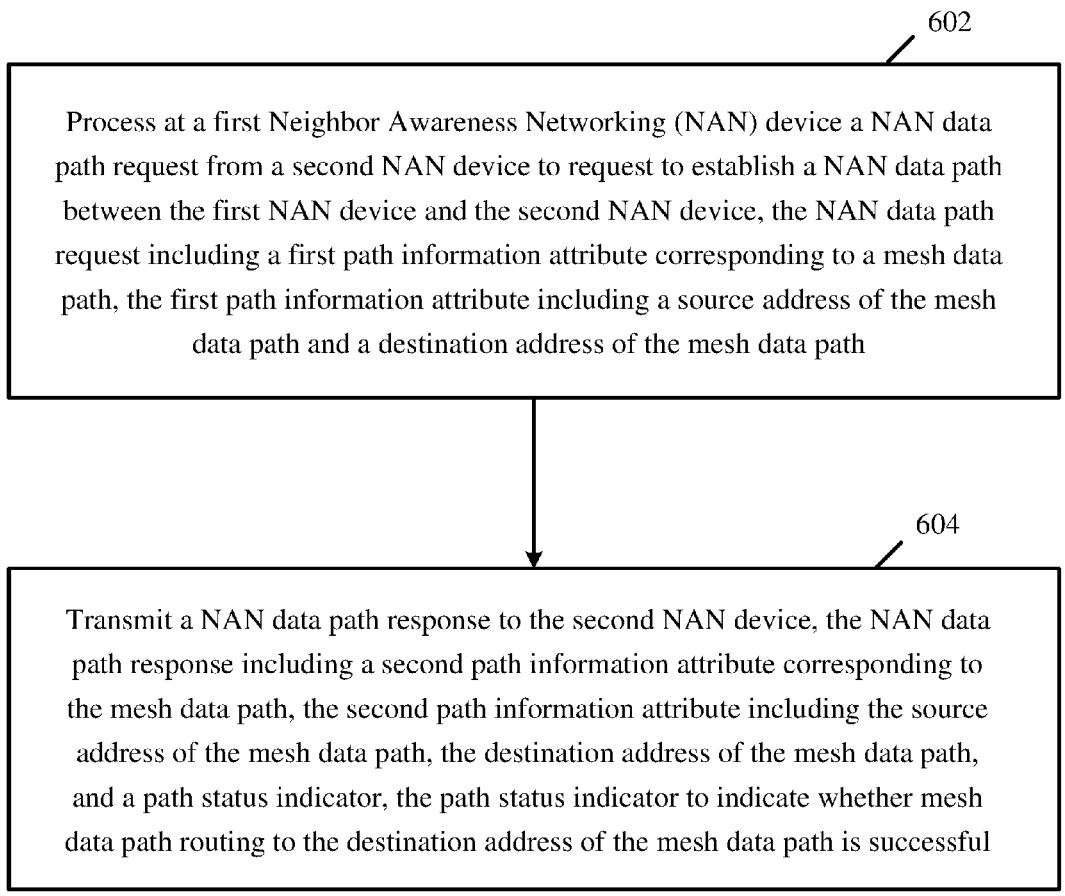
FIG. 6 is a schematic flow-chart illustration of a method of establishing a mesh data path, in accordance with some demonstrative embodiments.

Reference is made to FIG. 6, which schematically illustrates a method of establishing a mesh data path, in accordance with some demonstrative embodiments. For example, one or more of the operations of FIG. 6 may be performed by one or more elements of a system, system 100 (FIG. 1); a device, e.g., wireless communication devices 102, 160, 180 and/or 140 (FIG. 1); a controller, e.g., controller 124 (FIG. 1), and/or controller 154 (FIG. 1); a radio, e.g., radio 114 (FIG. 1), and/or radio 144 (FIG. 1); a message processor, e.g., message processor 128 (FIG. 1), and/or message processor 158 (FIG. 1); a mesh data engine, e.g., mesh data engines 132 and/or 152 (FIG. 1); and/or a NAN data engine, e.g., NAN data engines 136 and/or 156 (FIG. 1).

As indicated at block 602, the method may include processing at a first NAN device a NAN data path request from a second NAN device to request to establish a NAN data path between the first NAN device and the second NAN device, the NAN data path request including a first path information attribute corresponding to a mesh data path, the first path information attribute including a source address of the mesh data path and a destination address of the mesh data path. For example, controller 154 (FIG. 1) may control, cause and/or trigger device 140 (FIG. 1) to process NAN data path request 171 (FIG. 1) from device 102 (FIG. 1) including the path information attribute corresponding to the mesh data path, the first path information attribute including the source address of the mesh data path and the destination address of the mesh data path, e.g., as described above.

As indicated at block 604, the method may include transmitting a NAN data path response to the second NAN device, the NAN data path response including a second path information attribute corresponding to the mesh data path, the second path information attribute including the source address of the mesh data path, the destination address of the mesh data path, and a path status indicator, the path status indicator to indicate whether mesh data path routing to the destination address of the mesh data path is successful. For example, controller 154 (FIG. 1) may control, cause and/or trigger device 140 (FIG. 1) to transmit NAN data path response 172 (FIG. 1) including the path information attribute including the path status indicator to indicate whether mesh data path routing to the destination address of the mesh data path is successful, e.g., as described above.

Figure 7:
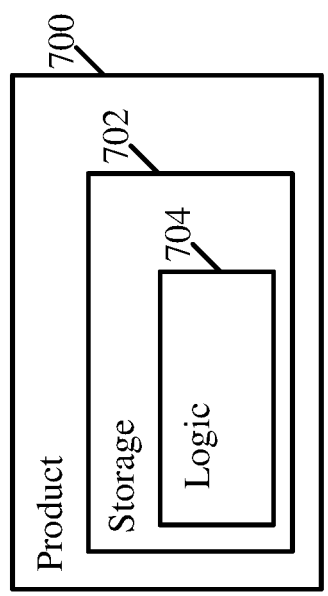
FIG. 7 is a schematic illustration of a product, in accordance with some demonstrative embodiments.

Reference is made to FIG. 7, which schematically illustrates a product of manufacture 700, in accordance with some demonstrative embodiments. Product 700 may include one or more tangible computer-readable non-transitory storage media 702, which may include computer-executable instructions, e.g., implemented by logic 704, operable to, when executed by at least one computer processor, enable the at least one computer processor to implement one or more operations at devices 102, 140, 160 and/or 180 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), message processor 158 (FIG. 1), mesh data engine 132 (FIG. 1), mesh data engine 152 (FIG. 1), NAN data engine 136 (FIG. 1), and/or NAN data engine 156 (FIG. 1), to cause devices 102, 140, 160 and/or 180 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), message processor 158 (FIG. 1), mesh data engine 132 (FIG. 1), mesh data engine 152 (FIG. 1), NAN data engine 136 (FIG. 1), and/or NAN data engine 156 (FIG. 1) to perform, trigger and/or implement one or more operations and/or functionalities, and/or to perform, trigger and/or implement one or more operations and/or functionalities described with reference to the FIGS. 1, 2, 3, 4, 5, and/or 6, and/or one or more operations described herein. The phrase "non-transitory machine-readable medium" is directed to include all computer-readable media, with the sole exception being a transitory propagating signal.

In some demonstrative embodiments, product 700 and/or machine-readable storage media 702 may include one or more types of computer-readable storage media capable of storing data, including volatile memory, non-volatile memory, removable or non-removable memory, erasable or non-erasable memory, writeable or re-writeable memory, and the like. For example, machine-readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first Neighbor Awareness Networking (NAN) device to transmit a NAN data path request to a second NAN device to request to establish a NAN data path between the first NAN device and the second NAN device, the NAN data path request comprising a first path information attribute corresponding to a mesh data path, the first path information attribute comprising a source address of the mesh data path and a destination address of the mesh data path; process a NAN data path response from the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing to the destination address of the mesh data path is successful; and select whether to complete establishing the NAN data path between the first NAN device and the second NAN device based at least on the path status indicator.

Example 2 includes the subject matter of Example 1, and optionally, wherein the apparatus is configured to cause the first NAN device to complete establishing the NAN data path between the first NAN device and the second NAN device, only when the path status indicator is to indicate that the mesh data path routing to the destination address of the mesh data path is successful.

Example 3 includes the subject matter of Example 1 or 2, and optionally, wherein the apparatus is configured to cause the first NAN device to terminate establishing the NAN data path between the first NAN device and the second NAN device, when the path status indicator is to indicate that the mesh data path routing to the destination address of the mesh data path is not successful.

Example 4 includes the subject matter of any one of Examples 1-3, and optionally, wherein the apparatus is configured to cause the first NAN device to transmit the NAN data path request to the second NAN device based on a NAN data path request from a third NAN device, the NAN data path request from the third NAN device to request to establish a NAN data path between the third NAN device and the first NAN device, the NAN data path request from the third NAN device comprising a third path information attribute corresponding to the mesh data path, the third path information attribute comprising the source address of the mesh data path and the destination address of the mesh data path.

Example 5 includes the subject matter of Example 4, and optionally, wherein the apparatus is configured to cause the first NAN device to transmit a NAN data path response to the third NAN device, the NAN data path response to the third NAN device comprising a fourth path information attribute corresponding to the mesh data path, the fourth path information attribute comprising the source address of the mesh data path, the destination address of the mesh data path, and the path status indicator to indicate whether the mesh data path routing to the destination address of the mesh data path is successful.

Example 6 includes the subject matter of Example 5, and optionally, wherein the apparatus is configured to cause the first NAN device to set the path status indicator in the fourth path information attribute based on the path status indicator in the second path information attribute.

Example 7 includes the subject matter of Example 5 or 6, and optionally, wherein the apparatus is configured to cause the first NAN device to set the path status indicator in the fourth path information attribute to indicate the mesh data path routing to the destination address of the mesh data path is successful, when the path status indicator in the second path information attribute is to indicate the mesh data path routing to the destination address of the mesh data path is successful.

Example 8 includes the subject matter of any one of Examples 5-7, and optionally, wherein the apparatus is configured to cause the first NAN device to set the path status indicator in the fourth path information attribute to indicate the mesh data path routing to the destination address of the mesh data path is not successful, when the path status indicator in the second path information attribute is to indicate the mesh data path routing to the destination address of the mesh data path is not successful.

Example 9 includes the subject matter of any one of Examples 5-8, and optionally, wherein the apparatus is configured to cause the first NAN device to set the path status indicator in the fourth path information attribute to indicate the mesh data path routing to the destination address of the mesh data path is not successful, when the second NAN device cannot be reached, or when the NAN data path response from the second NAN device is not received.

Example 10 includes the subject matter of any one of Examples 1-9, and optionally, wherein the apparatus is configured to cause the first NAN device to determine an address of the second NAN device based on routing information corresponding to the destination address of the mesh data path.

Example 11 includes the subject matter of any one of Examples 1-10, and optionally, wherein the first and second path information attributes comprise a path identifier (ID) corresponding to the mesh data path.

Example 12 includes the subject matter of any one of Examples 1-11, and optionally, comprising a NAN data engine to generate the NAN data path request based on a mesh data path request from a mesh data engine, the mesh data path request comprising an address of the second NAN device.

Example 13 includes the subject matter of Example 12, and optionally, comprising the mesh data engine to generate the mesh data path request based on routing information defining a routing path of the mesh data path.

Example 14 includes the subject matter of any one of Examples 1-13, and optionally, wherein the apparatus is configured to cause the first NAN device to transmit to the second NAN device a keep-alive message to indicate that the mesh data path is to be maintained.

Example 15 includes the subject matter of any one of Examples 1-14, and optionally, wherein the apparatus is configured to cause the first NAN device to transmit to the second NAN device a data path termination message to terminate the mesh data path.

Example 16 includes the subject matter of Example 15, and optionally, wherein the apparatus is configured to cause the first NAN device to transmit the termination message, when the mesh data path is idle for a time period longer than a termination threshold period.

Example 17 includes the subject matter of any one of Examples 1-16, and optionally, wherein the first and second path information attributes comprise first and second Path Specific Information attributes.

Example 18 includes the subject matter of any one of Examples 1-17, and optionally, comprising a radio.

Example 19 includes the subject matter of any one of Examples 1-18, and optionally, comprising one or more antennas, a processor, and a memory.

Example 20 includes a system of wireless communication comprising a first Neighbor Awareness Networking (NAN) device, the first NAN device comprising a radio; one or more antennas; a memory; a processor; and a controller configured to cause the first NAN device to transmit a NAN data path request to a second NAN device to request to establish a NAN data path between the first NAN device and the second NAN device, the NAN data path request comprising a first path information attribute corresponding to a mesh data path, the first path information attribute comprising a source address of the mesh data path and a destination address of the mesh data path; process a NAN data path response from the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing to the destination address of the mesh data path is successful; and select whether to complete establishing the NAN data path between the first NAN device and the second NAN device based at least on the path status indicator.

Example 21 includes the subject matter of Example 20, and optionally, wherein the controller is configured to cause the first NAN device to complete establishing the NAN data path between the first NAN device and the second NAN device, only when the path status indicator is to indicate that the mesh data path routing to the destination address of the mesh data path is successful.

Example 22 includes the subject matter of Example 20 or 21, and optionally, wherein the controller is configured to cause the first NAN device to terminate establishing the NAN data path between the first NAN device and the second NAN device, when the path status indicator is to indicate that the mesh data path routing to the destination address of the mesh data path is not successful.

Example 23 includes the subject matter of any one of Examples 20-22, and optionally, wherein the controller is configured to cause the first NAN device to transmit the NAN data path request to the second NAN device based on a NAN data path request from a third NAN device, the NAN data path request from the third NAN device to request to establish a NAN data path between the third NAN device and the first NAN device, the NAN data path request from the third NAN device comprising a third path information attribute corresponding to the mesh data path, the third path information attribute comprising the source address of the mesh data path and the destination address of the mesh data path.

Example 24 includes the subject matter of Example 23, and optionally, wherein the controller is configured to cause the first NAN device to transmit a NAN data path response to the third NAN device, the NAN data path response to the third NAN device comprising a fourth path information attribute corresponding to the mesh data path, the fourth path information attribute comprising the source address of the mesh data path, the destination address of the mesh data path, and the path status indicator to indicate whether the mesh data path routing to the destination address of the mesh data path is successful.

Example 25 includes the subject matter of Example 24, and optionally, wherein the controller is configured to cause the first NAN device to set the path status indicator in the fourth path information attribute based on the path status indicator in the second path information attribute.

Example 26 includes the subject matter of Example 24 or 25, and optionally, wherein the controller is configured to cause the first NAN device to set the path status indicator in the fourth path information attribute to indicate the mesh data path routing to the destination address of the mesh data path is successful, when the path status indicator in the second path information attribute is to indicate the mesh data path routing to the destination address of the mesh data path is successful.

Example 27 includes the subject matter of any one of Examples 24-26, and optionally, wherein the controller is configured to cause the first NAN device to set the path status indicator in the fourth path information attribute to indicate the mesh data path routing to the destination address of the mesh data path is not successful, when the path status indicator in the second path information attribute is to indicate the mesh data path routing to the destination address of the mesh data path is not successful.

Example 28 includes the subject matter of any one of Examples 24-27, and optionally, wherein the controller is configured to cause the first NAN device to set the path status indicator in the fourth path information attribute to indicate the mesh data path routing to the destination address of the mesh data path is not successful, when the second NAN device cannot be reached, or when the NAN data path response from the second NAN device is not received.

Example 29 includes the subject matter of any one of Examples 20-28, and optionally, wherein the controller is configured to cause the first NAN device to determine an address of the second NAN device based on routing information corresponding to the destination address of the mesh data path.

Example 30 includes the subject matter of any one of Examples 20-29, and optionally, wherein the first and second path information attributes comprise a path identifier (ID) corresponding to the mesh data path.

Example 31 includes the subject matter of any one of Examples 20-30, and optionally, wherein the first NAN device comprises a NAN data engine to generate the NAN data path request based on a mesh data path request from a mesh data engine, the mesh data path request comprising an address of the second NAN device.

Example 32 includes the subject matter of Example 31, and optionally, wherein the first NAN device comprises the mesh data engine to generate the mesh data path request based on routing information defining a routing path of the mesh data path.

Example 33 includes the subject matter of any one of Examples 20-32, and optionally, wherein the controller is configured to cause the first NAN device to transmit to the second NAN device a keep-alive message to indicate that the mesh data path is to be maintained.

Example 34 includes the subject matter of any one of Examples 20-33, and optionally, wherein the controller is configured to cause the first NAN device to transmit to the second NAN device a data path termination message to terminate the mesh data path.

Example 35 includes the subject matter of Example 34, and optionally, wherein the controller is configured to cause the first NAN device to transmit the termination message, when the mesh data path is idle for a time period longer than a termination threshold period.

Example 36 includes the subject matter of any one of Examples 20-35, and optionally, wherein the first and second path information attributes comprise first and second Path Specific Information attributes.

Example 37 includes a method to be performed at a first Neighbor Awareness Networking (NAN) device, the method comprising transmitting a NAN data path request to a second NAN device to request to establish a NAN data path between the first NAN device and the second NAN device, the NAN data path request comprising a first path information attribute corresponding to a mesh data path, the first path information attribute comprising a source address of the mesh data path and a destination address of the mesh data path; processing a NAN data path response from the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing to the destination address of the mesh data path is successful; and selecting whether to complete establishing the NAN data path between the first NAN device and the second NAN device based at least on the path status indicator.

Example 38 includes the subject matter of Example 37, and optionally, comprising completing establishing the NAN data path between the first NAN device and the second NAN device, only when the path status indicator is to indicate that the mesh data path routing to the destination address of the mesh data path is successful.

Example 39 includes the subject matter of Example 37 or 38, and optionally, comprising terminating establishing the NAN data path between the first NAN device and the second NAN device, when the path status indicator is to indicate that the mesh data path routing to the destination address of the mesh data path is not successful.

Example 40 includes the subject matter of any one of Examples 37-39, and optionally, comprising transmitting the NAN data path request to the second NAN device based on a NAN data path request from a third NAN device, the NAN data path request from the third NAN device to request to establish a NAN data path between the third NAN device and the first NAN device, the NAN data path request from the third NAN device comprising a third path information attribute corresponding to the mesh data path, the third path information attribute comprising the source address of the mesh data path and the destination address of the mesh data path.

Example 41 includes the subject matter of Example 40, and optionally, comprising transmitting a NAN data path response to the third NAN device, the NAN data path response to the third NAN device comprising a fourth path information attribute corresponding to the mesh data path, the fourth path information attribute comprising the source address of the mesh data path, the destination address of the mesh data path, and the path status indicator to indicate whether the mesh data path routing to the destination address of the mesh data path is successful.

Example 42 includes the subject matter of Example 41, and optionally, comprising setting the path status indicator in the fourth path information attribute based on the path status indicator in the second path information attribute.

Example 43 includes the subject matter of Example 41 or 42, and optionally, comprising setting the path status indicator in the fourth path information attribute to indicate the mesh data path routing to the destination address of the mesh data path is successful, when the path status indicator in the second path information attribute is to indicate the mesh data path routing to the destination address of the mesh data path is successful.

Example 44 includes the subject matter of any one of Examples 41-43, and optionally, comprising setting the path status indicator in the fourth path information attribute to indicate the mesh data path routing to the destination address of the mesh data path is not successful, when the path status indicator in the second path information attribute is to indicate the mesh data path routing to the destination address of the mesh data path is not successful.

Example 45 includes the subject matter of any one of Examples 41-44, and optionally, comprising setting the path status indicator in the fourth path information attribute to indicate the mesh data path routing to the destination address of the mesh data path is not successful, when the second NAN device cannot be reached, or when the NAN data path response from the second NAN device is not received.

Example 46 includes the subject matter of any one of Examples 37-45, and optionally, comprising determining an address of the second NAN device based on routing information corresponding to the destination address of the mesh data path.

Example 47 includes the subject matter of any one of Examples 37-46, and optionally, wherein the first and second path information attributes comprise a path identifier (ID) corresponding to the mesh data path.

Example 48 includes the subject matter of any one of Examples 37-47, and optionally, comprising generating the NAN data path request based on a mesh data path request from a mesh data engine, the mesh data path request comprising an address of the second NAN device.

Example 49 includes the subject matter of Example 48, and optionally, comprising generating the mesh data path request based on routing information defining a routing path of the mesh data path.

Example 50 includes the subject matter of any one of Examples 37-49, and optionally, comprising transmitting to the second NAN device a keep-alive message to indicate that the mesh data path is to be maintained.

Example 51 includes the subject matter of any one of Examples 37-50, and optionally, comprising transmitting to the second NAN device a data path termination message to terminate the mesh data path.

Example 52 includes the subject matter of Example 51, and optionally, comprising transmitting the termination message, when the mesh data path is idle for a time period longer than a termination threshold period.

Example 53 includes the subject matter of any one of Examples 37-52, and optionally, wherein the first and second path information attributes comprise first and second Path Specific Information attributes.

Example 54 includes a product comprising one or more tangible computer-readable non-transitory storage media comprising computer-executable instructions operable to, when executed by at least one computer processor, enable the at least one computer processor to cause a first Neighbor Awareness Networking (NAN) device to transmit a NAN data path request to a second NAN device to request to establish a NAN data path between the first NAN device and the second NAN device, the NAN data path request comprising a first path information attribute corresponding to a mesh data path, the first path information attribute comprising a source address of the mesh data path and a destination address of the mesh data path; process a NAN data path response from the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing to the destination address of the mesh data path is successful; and select whether to complete establishing the NAN data path between the first NAN device and the second NAN device based at least on the path status indicator.

Example 55 includes the subject matter of Example 54, and optionally, wherein the instructions, when executed, cause the first NAN device to complete establishing the NAN data path between the first NAN device and the second NAN device, only when the path status indicator is to indicate that the mesh data path routing to the destination address of the mesh data path is successful.

Example 56 includes the subject matter of Example 54 or 55, and optionally, wherein the instructions, when executed, cause the first NAN device to terminate establishing the NAN data path between the first NAN device and the second NAN device, when the path status indicator is to indicate that the mesh data path routing to the destination address of the mesh data path is not successful.

Example 57 includes the subject matter of any one of Examples 54-56, and optionally, wherein the instructions, when executed, cause the first NAN device to transmit the NAN data path request to the second NAN device based on a NAN data path request from a third NAN device, the NAN data path request from the third NAN device to request to establish a NAN data path between the third NAN device and the first NAN device, the NAN data path request from the third NAN device comprising a third path information attribute corresponding to the mesh data path, the third path information attribute comprising the source address of the mesh data path and the destination address of the mesh data path.

Example 58 includes the subject matter of Example 57, and optionally, wherein the instructions, when executed, cause the first NAN device to transmit a NAN data path response to the third NAN device, the NAN data path response to the third NAN device comprising a fourth path information attribute corresponding to the mesh data path, the fourth path information attribute comprising the source address of the mesh data path, the destination address of the mesh data path, and the path status indicator to indicate whether the mesh data path routing to the destination address of the mesh data path is successful.

Example 59 includes the subject matter of Example 58, and optionally, wherein the instructions, when executed, cause the first NAN device to set the path status indicator in the fourth path information attribute based on the path status indicator in the second path information attribute.

Example 60 includes the subject matter of Example 58 or 59, and optionally, wherein the instructions, when executed, cause the first NAN device to set the path status indicator in the fourth path information attribute to indicate the mesh data path routing to the destination address of the mesh data path is successful, when the path status indicator in the second path information attribute is to indicate the mesh data path routing to the destination address of the mesh data path is successful.

Example 61 includes the subject matter of any one of Examples 58-60, and optionally, wherein the instructions, when executed, cause the first NAN device to set the path status indicator in the fourth path information attribute to indicate the mesh data path routing to the destination address of the mesh data path is not successful, when the path status indicator in the second path information attribute is to indicate the mesh data path routing to the destination address of the mesh data path is not successful.

Example 62 includes the subject matter of any one of Examples 58-61, and optionally, wherein the instructions, when executed, cause the first NAN device to set the path status indicator in the fourth path information attribute to indicate the mesh data path routing to the destination address of the mesh data path is not successful, when the second NAN device cannot be reached, or when the NAN data path response from the second NAN device is not received.

Example 63 includes the subject matter of any one of Examples 54-62, and optionally, wherein the instructions, when executed, cause the first NAN device to determine an address of the second NAN device based on routing information corresponding to the destination address of the mesh data path.

Example 64 includes the subject matter of any one of Examples 54-63, and optionally, wherein the first and second path information attributes comprise a path identifier (ID) corresponding to the mesh data path.

Example 65 includes the subject matter of any one of Examples 54-64, and optionally, wherein the instructions, when executed, cause the first NAN device to generate the NAN data path request based on a mesh data path request from a mesh data engine, the mesh data path request comprising an address of the second NAN device.

Example 66 includes the subject matter of Example 65, and optionally, wherein the instructions, when executed, cause the first NAN device to generate the mesh data path request based on routing information defining a routing path of the mesh data path.

Example 67 includes the subject matter of any one of Examples 54-66, and optionally, wherein the instructions, when executed, cause the first NAN device to transmit to the second NAN device a keep-alive message to indicate that the mesh data path is to be maintained.

Example 68 includes the subject matter of any one of Examples 54-67, and optionally, wherein the instructions, when executed, cause the first NAN device to transmit to the second NAN device a data path termination message to terminate the mesh data path.

Example 69 includes the subject matter of Example 68, and optionally, wherein the instructions, when executed, cause the first NAN device to transmit the termination message, when the mesh data path is idle for a time period longer than a termination threshold period.

Example 70 includes the subject matter of any one of Examples 54-69, and optionally, wherein the first and second path information attributes comprise first and second Path Specific Information attributes.

Example 71 includes an apparatus of wireless communication by a first Neighbor Awareness Networking (NAN) device, the apparatus comprising means for transmitting a NAN data path request to a second NAN device to request to establish a NAN data path between the first NAN device and the second NAN device, the NAN data path request comprising a first path information attribute corresponding to a mesh data path, the first path information attribute comprising a source address of the mesh data path and a destination address of the mesh data path; means for processing a NAN data path response from the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing to the destination address of the mesh data path is successful; and means for selecting whether to complete establishing the NAN data path between the first NAN device and the second NAN device based at least on the path status indicator.

Example 72 includes the subject matter of Example 71, and optionally, comprising means for completing establishing the NAN data path between the first NAN device and the second NAN device, only when the path status indicator is to indicate that the mesh data path routing to the destination address of the mesh data path is successful.

Example 73 includes the subject matter of Example 71 or 72, and optionally, comprising means for terminating establishing the NAN data path between the first NAN device and the second NAN device, when the path status indicator is to indicate that the mesh data path routing to the destination address of the mesh data path is not successful.

Example 74 includes the subject matter of any one of Examples 71-73, and optionally, comprising means for transmitting the NAN data path request to the second NAN device based on a NAN data path request from a third NAN device, the NAN data path request from the third NAN device to request to establish a NAN data path between the third NAN device and the first NAN device, the NAN data path request from the third NAN device comprising a third path information attribute corresponding to the mesh data path, the third path information attribute comprising the source address of the mesh data path and the destination address of the mesh data path.

Example 75 includes the subject matter of Example 74, and optionally, comprising means for transmitting a NAN data path response to the third NAN device, the NAN data path response to the third NAN device comprising a fourth path information attribute corresponding to the mesh data path, the fourth path information attribute comprising the source address of the mesh data path, the destination address of the mesh data path, and the path status indicator to indicate whether the mesh data path routing to the destination address of the mesh data path is successful.

Example 76 includes the subject matter of Example 75, and optionally, comprising means for setting the path status indicator in the fourth path information attribute based on the path status indicator in the second path information attribute.

Example 77 includes the subject matter of Example 75 or 76, and optionally, comprising means for setting the path status indicator in the fourth path information attribute to indicate the mesh data path routing to the destination address of the mesh data path is successful, when the path status indicator in the second path information attribute is to indicate the mesh data path routing to the destination address of the mesh data path is successful.

Example 78 includes the subject matter of any one of Examples 75-77, and optionally, comprising means for setting the path status indicator in the fourth path information attribute to indicate the mesh data path routing to the destination address of the mesh data path is not successful, when the path status indicator in the second path information attribute is to indicate the mesh data path routing to the destination address of the mesh data path is not successful.

Example 79 includes the subject matter of any one of Examples 75-78, and optionally, comprising means for setting the path status indicator in the fourth path information attribute to indicate the mesh data path routing to the destination address of the mesh data path is not successful, when the second NAN device cannot be reached, or when the NAN data path response from the second NAN device is not received.

Example 80 includes the subject matter of any one of Examples 71-79, and optionally, comprising means for determining an address of the second NAN device based on routing information corresponding to the destination address of the mesh data path.

Example 81 includes the subject matter of any one of Examples 71-80, and optionally, wherein the first and second path information attributes comprise a path identifier (ID) corresponding to the mesh data path.

Example 82 includes the subject matter of any one of Examples 71-81, and optionally, comprising means for generating the NAN data path request based on a mesh data path request from a mesh data engine, the mesh data path request comprising an address of the second NAN device.

Example 83 includes the subject matter of Example 82, and optionally, comprising means for generating the mesh data path request based on routing information defining a routing path of the mesh data path.

Example 84 includes the subject matter of any one of Examples 71-83, and optionally, comprising means for transmitting to the second NAN device a keep-alive message to indicate that the mesh data path is to be maintained.

Example 85 includes the subject matter of any one of Examples 71-84, and optionally, comprising means for transmitting to the second NAN device a data path termination message to terminate the mesh data path.

Example 86 includes the subject matter of Example 85, and optionally, comprising means for transmitting the termination message, when the mesh data path is idle for a time period longer than a termination threshold period.

Example 87 includes the subject matter of any one of Examples 71-86, and optionally, wherein the first and second Path Specific Information attributes.

Example 88 includes an apparatus comprising logic and circuitry configured to cause a first Neighbor Awareness Networking (NAN) device to process a NAN data path request from a second NAN device to request to establish a NAN data path between the first NAN device and the second NAN device, the NAN data path request comprising a first path information attribute corresponding to a mesh data path, the first path information attribute comprising a source address of the mesh data path and a destination address of the mesh data path; and transmit a NAN data path response to the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing to the destination address of the mesh data path is successful.

Example 89 includes the subject matter of Example 88, and optionally, wherein the apparatus is configured to cause the first NAN device to select whether to complete establishing the NAN data path between the first NAN device and the second NAN device based at least on whether the mesh data path routing to the destination address of the mesh data path is successful.

Example 90 includes the subject matter of Example 89, and optionally, wherein the apparatus is configured to cause the first NAN device to complete establishing the NAN data path between the first NAN device and the second NAN device, only when the mesh data path routing to the destination address of the mesh data path is successful.

Example 91 includes the subject matter of Example 89 or 90, and optionally, wherein the apparatus is configured to cause the first NAN device to terminate establishing the NAN data path between the first NAN device and the second NAN device, when the mesh data path routing to the destination address of the mesh data path is not successful.

Example 92 includes the subject matter of any one of Examples 88-91, and optionally, wherein the apparatus is configured to cause the first NAN device to transmit a NAN data path request to a third NAN device, the NAN data path request to the third NAN device to request to establish a NAN data path between the first NAN device and the third NAN device, the NAN data path request to the third NAN device comprising a third path information attribute corresponding to the mesh data path, the third path information attribute comprising the source address of the mesh data path and the destination address of the mesh data path.

Example 93 includes the subject matter of Example 92, and optionally, wherein the apparatus is configured to cause the first NAN device to process a NAN data path response from the third NAN device, the NAN data path response from the third NAN device comprising a fourth path information attribute corresponding to the mesh data path, the fourth path information attribute comprising the source address of the mesh data path, the destination address of the mesh data path, and the path status indicator to indicate whether the mesh data path routing to the destination address of the mesh data path is successful.

Example 94 includes the subject matter of Example 93, and optionally, wherein the apparatus is configured to cause the first NAN device to set the path status indicator in the second path information attribute based on the path status indicator in the fourth path information attribute.

Example 95 includes the subject matter of Example 93 or 94, and optionally, wherein the apparatus is configured to cause the first NAN device to set the path status indicator in the second path information attribute to indicate the mesh data path routing to the destination address of the mesh data path is successful, when the path status indicator in the fourth path information attribute is to indicate the mesh data path routing to the destination address of the mesh data path is successful.

Example 96 includes the subject matter of any one of Examples 93-95, and optionally, wherein the apparatus is configured to cause the first NAN device to set the path status indicator in the second path information attribute to indicate the mesh data path routing to the destination address of the mesh data path is not successful, when the path status indicator in the fourth path information attribute is to indicate the mesh data path routing to the destination address of the mesh data path is not successful.

Example 97 includes the subject matter of any one of Examples 92-96, and optionally, wherein the apparatus is configured to cause the first NAN device to set the path status indicator in the second path information attribute to indicate the mesh data path routing to the destination address of the mesh data path is not successful, when a NAN data path response from the third NAN device is not received.

Example 98 includes the subject matter of any one of Examples 92-97, and optionally, wherein the apparatus is configured to cause the first NAN device to determine an address of the third NAN device based on routing information corresponding to the destination address of the mesh data path.

Example 99 includes the subject matter of any one of Examples 92-98, and optionally, comprising a NAN data engine to provide to a mesh data engine a mesh data path request indication comprising the source address of the mesh data path and the destination address of the mesh data path, the NAN data engine to generate the NAN data path request to the third NAN device based on a mesh data path request from the mesh data engine, the mesh data path request comprising an address of the third NAN device.

Example 100 includes the subject matter of Example 99, and optionally, comprising the mesh data engine to generate the mesh data path request based on routing information defining a routing path of the mesh data path.

Example 101 includes the subject matter of any one of Examples 88-100, and optionally, wherein the apparatus is configured to cause the first NAN device to set the path status indicator in the second path information attribute to indicate the mesh data path routing to the destination address of the mesh data path is not successful, when a third NAN device, which is subsequent to the first NAN device along a routing path of the mesh data path, cannot be reached.

Example 102 includes the subject matter of any one of Examples 88-101, and optionally, wherein the first and second path information attributes comprise a path identifier (ID) corresponding to the mesh data path.

Example 103 includes the subject matter of any one of Examples 88-102, and optionally, wherein the apparatus is configured to cause the first NAN device to process a keep-alive message from the second NAN device to indicate that the mesh data path is to be maintained.

Example 104 includes the subject matter of any one of Examples 88-103, and optionally, wherein the apparatus is configured to cause the first NAN device to transmit to the second NAN device a data path termination message to terminate the mesh data path.

Example 105 includes the subject matter of Example 104, and optionally, wherein the apparatus is configured to cause the first NAN device to transmit the termination message, when the mesh data path is idle for a time period longer than a termination threshold period.

Example 106 includes the subject matter of any one of Examples 88-105, and optionally, wherein the first and second path information attributes comprise first and second Path Specific Information attributes.

Example 107 includes the subject matter of any one of Examples 88-106, and optionally, comprising a radio.

Example 108 includes the subject matter of any one of Examples 88-107, and optionally, comprising one or more antennas, a processor, and a memory.

Example 109 includes a system of wireless communication comprising a first Neighbor Awareness Networking (NAN) device, the first NAN device comprising a radio; one or more antennas; a memory; a processor; and a controller configured to cause the first NAN device to process a NAN data path request from a second NAN device to request to establish a NAN data path between the first NAN device and the second NAN device, the NAN data path request comprising a first path information attribute corresponding to a mesh data path, the first path information attribute comprising a source address of the mesh data path and a destination address of the mesh data path; and transmit a NAN data path response to the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing to the destination address of the mesh data path is successful.

Example 110 includes the subject matter of Example 109, and optionally, wherein the controller is configured to cause the first NAN device to select whether to complete establishing the NAN data path between the first NAN device and the second NAN device based at least on whether the mesh data path routing to the destination address of the mesh data path is successful.

Example 111 includes the subject matter of Example 110, and optionally, wherein the controller is configured to cause the first NAN device to complete establishing the NAN data path between the first NAN device and the second NAN device, only when the mesh data path routing to the destination address of the mesh data path is successful.

Example 112 includes the subject matter of Example 110 or 111, and optionally, wherein the controller is configured to cause the first NAN device to terminate establishing the NAN data path between the first NAN device and the second NAN device, when the mesh data path routing to the destination address of the mesh data path is not successful.

Example 113 includes the subject matter of any one of Examples 109-112, and optionally, wherein the controller is configured to cause the first NAN device to transmit a NAN data path request to a third NAN device, the NAN data path request to the third NAN device to request to establish a NAN data path between the first NAN device and the third NAN device, the NAN data path request to the third NAN device comprising a third path information attribute corresponding to the mesh data path, the third path information attribute comprising the source address of the mesh data path and the destination address of the mesh data path.

Example 114 includes the subject matter of Example 113, and optionally, wherein the controller is configured to cause the first NAN device to process a NAN data path response from the third NAN device, the NAN data path response from the third NAN device comprising a fourth path information attribute corresponding to the mesh data path, the fourth path information attribute comprising the source address of the mesh data path, the destination address of the mesh data path, and the path status indicator to indicate whether the mesh data path routing to the destination address of the mesh data path is successful.

Example 115 includes the subject matter of Example 114, and optionally, wherein the controller is configured to cause the first NAN device to set the path status indicator in the second path information attribute based on the path status indicator in the fourth path information attribute.

Example 116 includes the subject matter of Example 114 or 115, and optionally, wherein the controller is configured to cause the first NAN device to set the path status indicator in the second path information attribute to indicate the mesh data path routing to the destination address of the mesh data path is successful, when the path status indicator in the fourth path information attribute is to indicate the mesh data path routing to the destination address of the mesh data path is successful.

Example 117 includes the subject matter of any one of Examples 114-116, and optionally, wherein the controller is configured to cause the first NAN device to set the path status indicator in the second path information attribute to indicate the mesh data path routing to the destination address of the mesh data path is not successful, when the path status indicator in the fourth path information attribute is to indicate the mesh data path routing to the destination address of the mesh data path is not successful.

Example 118 includes the subject matter of any one of Examples 113-117, and optionally, wherein the controller is configured to cause the first NAN device to set the path status indicator in the second path information attribute to indicate the mesh data path routing to the destination address of the mesh data path is not successful, when a NAN data path response from the third NAN device is not received.

Example 119 includes the subject matter of any one of Examples 113-118, and optionally, wherein the controller is configured to cause the first NAN device to determine an address of the third NAN device based on routing information corresponding to the destination address of the mesh data path.

Example 120 includes the subject matter of any one of Examples 113-119, and optionally, wherein the first NAN device comprises a NAN data engine to provide to a mesh data engine a mesh data path request indication comprising the source address of the mesh data path and the destination address of the mesh data path, the NAN data engine to generate the NAN data path request to the third NAN device based on a mesh data path request from the mesh data engine, the mesh data path request comprising an address of the third NAN device.

Example 121 includes the subject matter of Example 120, and optionally, wherein the first NAN device comprises the mesh data engine to generate the mesh data path request based on routing information defining a routing path of the mesh data path.

Example 122 includes the subject matter of any one of Examples 109-121, and optionally, wherein the controller is configured to cause the first NAN device to set the path status indicator in the second path information attribute to indicate the mesh data path routing to the destination address of the mesh data path is not successful, when a third NAN device, which is subsequent to the first NAN device along a routing path of the mesh data path, cannot be reached.

Example 123 includes the subject matter of any one of Examples 109-122, and optionally, wherein the first and second path information attributes comprise a path identifier (ID) corresponding to the mesh data path.

Example 124 includes the subject matter of any one of Examples 109-123, and optionally, wherein the controller is configured to cause the first NAN device to process a keep-alive message from the second NAN device to indicate that the mesh data path is to be maintained.

Example 125 includes the subject matter of any one of Examples 109-124, and optionally, wherein the controller is configured to cause the first NAN device to transmit to the second NAN device a data path termination message to terminate the mesh data path.

Example 126 includes the subject matter of Example 125, and optionally, wherein the controller is configured to cause the first NAN device to transmit the termination message, when the mesh data path is idle for a time period longer than a termination threshold period.

Example 127 includes the subject matter of any one of Examples 109-126, and optionally, wherein the first and second path information attributes comprise first and second Path Specific Information attributes.

Example 128 includes a method to be performed at a first Neighbor Awareness Networking (NAN) device, the method comprising processing a NAN data path request from a second NAN device to request to establish a NAN data path between the first NAN device and the second NAN device, the NAN data path request comprising a first path information attribute corresponding to a mesh data path, the first path information attribute comprising a source address of the mesh data path and a destination address of the mesh data path; and transmitting a NAN data path response to the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing to the destination address of the mesh data path is successful.

Example 129 includes the subject matter of Example 128, and optionally, comprising selecting whether to complete establishing the NAN data path between the first NAN device and the second NAN device based at least on whether the mesh data path routing to the destination address of the mesh data path is successful.

Example 130 includes the subject matter of Example 129, and optionally, comprising completing establishing the NAN data path between the first NAN device and the second NAN device, only when the mesh data path routing to the destination address of the mesh data path is successful.

Example 131 includes the subject matter of Example 129 or 130, and optionally, comprising terminating establishing the NAN data path between the first NAN device and the second NAN device, when the mesh data path routing to the destination address of the mesh data path is not successful.

Example 132 includes the subject matter of any one of Examples 128-131, and optionally, comprising transmitting a NAN data path request to a third NAN device, the NAN data path request to the third NAN device to request to establish a NAN data path between the first NAN device and the third NAN device, the NAN data path request to the third NAN device comprising a third path information attribute corresponding to the mesh data path, the third path information attribute comprising the source address of the mesh data path and the destination address of the mesh data path.

Example 133 includes the subject matter of Example 132, and optionally, comprising processing a NAN data path response from the third NAN device, the NAN data path response from the third NAN device comprising a fourth path information attribute corresponding to the mesh data path, the fourth path information attribute comprising the source address of the mesh data path, the destination address of the mesh data path, and the path status indicator to indicate whether the mesh data path routing to the destination address of the mesh data path is successful.

Example 134 includes the subject matter of Example 133, and optionally, comprising setting the path status indicator in the second path information attribute based on the path status indicator in the fourth path information attribute.

Example 135 includes the subject matter of Example 133 or 134, and optionally, comprising setting the path status indicator in the second path information attribute to indicate the mesh data path routing to the destination address of the mesh data path is successful, when the path status indicator in the fourth path information attribute is to indicate the mesh data path routing to the destination address of the mesh data path is successful.

Example 136 includes the subject matter of any one of Examples 133-135, and optionally, comprising setting the path status indicator in the second path information attribute to indicate the mesh data path routing to the destination address of the mesh data path is not successful, when the path status indicator in the fourth path information attribute is to indicate the mesh data path routing to the destination address of the mesh data path is not successful.

Example 137 includes the subject matter of any one of Examples 132-136, and optionally, comprising setting the path status indicator in the second path information attribute to indicate the mesh data path routing to the destination address of the mesh data path is not successful, when a NAN data path response from the third NAN device is not received.

Example 138 includes the subject matter of any one of Examples 132-137, and optionally, comprising determining an address of the third NAN device based on routing information corresponding to the destination address of the mesh data path.

Example 139 includes the subject matter of any one of Examples 132-138, and optionally, comprising providing to a mesh data engine a mesh data path request indication comprising the source address of the mesh data path and the destination address of the mesh data path, and generating the NAN data path request to the third NAN device based on a mesh data path request from the mesh data engine, the mesh data path request comprising an address of the third NAN device.

Example 140 includes the subject matter of Example 139, and optionally, comprising generating the mesh data path request based on routing information defining a routing path of the mesh data path.

Example 141 includes the subject matter of any one of Examples 128-140, and optionally, comprising setting the path status indicator in the second path information attribute to indicate the mesh data path routing to the destination address of the mesh data path is not successful, when a third NAN device, which is subsequent to the first NAN device along a routing path of the mesh data path, cannot be reached.

Example 142 includes the subject matter of any one of Examples 128-141, and optionally, wherein the first and second path information attributes comprise a path identifier (ID) corresponding to the mesh data path.

Example 143 includes the subject matter of any one of Examples 128-142, and optionally, comprising processing a keep-alive message from the second NAN device to indicate that the mesh data path is to be maintained.

Example 144 includes the subject matter of any one of Examples 128-143, and optionally, comprising transmitting to the second NAN device a data path termination message to terminate the mesh data path.

Example 145 includes the subject matter of Example 144, and optionally, comprising transmitting the termination message, when the mesh data path is idle for a time period longer than a termination threshold period.

Example 146 includes the subject matter of any one of Examples 128-145, and optionally, wherein the first and second path information attributes comprise first and second Path Specific Information attributes.

Example 147 includes a product comprising one or more tangible computer-readable non-transitory storage media comprising computer-executable instructions operable to, when executed by at least one computer processor, enable the at least one computer processor to cause a first Neighbor Awareness Networking (NAN) device to process a NAN data path request from a second NAN device to request to establish a NAN data path between the first NAN device and the second NAN device, the NAN data path request comprising a first path information attribute corresponding to a mesh data path, the first path information attribute comprising a source address of the mesh data path and a destination address of the mesh data path; and transmit a NAN data path response to the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing to the destination address of the mesh data path is successful.

Example 148 includes the subject matter of Example 147, and optionally, wherein the instructions, when executed, cause the first NAN device to select whether to complete establishing the NAN data path between the first NAN device and the second NAN device based at least on whether the mesh data path routing to the destination address of the mesh data path is successful.

Example 149 includes the subject matter of Example 148, and optionally, wherein the instructions, when executed, cause the first NAN device to complete establishing the NAN data path between the first NAN device and the second NAN device, only when the mesh data path routing to the destination address of the mesh data path is successful.

Example 150 includes the subject matter of Example 148 or 149, and optionally, wherein the instructions, when executed, cause the first NAN device to terminate establishing the NAN data path between the first NAN device and the second NAN device, when the mesh data path routing to the destination address of the mesh data path is not successful.

Example 151 includes the subject matter of any one of Examples 147-150, and optionally, wherein the instructions, when executed, cause the first NAN device to transmit a NAN data path request to a third NAN device, the NAN data path request to the third NAN device to request to establish a NAN data path between the first NAN device and the third NAN device, the NAN data path request to the third NAN device comprising a third path information attribute corresponding to the mesh data path, the third path information attribute comprising the source address of the mesh data path and the destination address of the mesh data path.

Example 152 includes the subject matter of Example 151, and optionally, wherein the instructions, when executed, cause the first NAN device to process a NAN data path response from the third NAN device, the NAN data path response from the third NAN device comprising a fourth path information attribute corresponding to the mesh data path, the fourth path information attribute comprising the source address of the mesh data path, the destination address of the mesh data path, and the path status indicator to indicate whether the mesh data path routing to the destination address of the mesh data path is successful.

Example 153 includes the subject matter of Example 152, and optionally, wherein the instructions, when executed, cause the first NAN device to set the path status indicator in the second path information attribute based on the path status indicator in the fourth path information attribute.

Example 154 includes the subject matter of Example 152 or 153, and optionally, wherein the instructions, when executed, cause the first NAN device to set the path status indicator in the second path information attribute to indicate the mesh data path routing to the destination address of the mesh data path is successful, when the path status indicator in the fourth path information attribute is to indicate the mesh data path routing to the destination address of the mesh data path is successful.

Example 155 includes the subject matter of any one of Examples 152-154, and optionally, wherein the instructions, when executed, cause the first NAN device to set the path status indicator in the second path information attribute to indicate the mesh data path routing to the destination address of the mesh data path is not successful, when the path status indicator in the fourth path information attribute is to indicate the mesh data path routing to the destination address of the mesh data path is not successful.

Example 156 includes the subject matter of any one of Examples 151-155, and optionally, wherein the instructions, when executed, cause the first NAN device to set the path status indicator in the second path information attribute to indicate the mesh data path routing to the destination address of the mesh data path is not successful, when a NAN data path response from the third NAN device is not received.

Example 157 includes the subject matter of any one of Examples 151-156, and optionally, wherein the instructions, when executed, cause the first NAN device to determine an address of the third NAN device based on routing information corresponding to the destination address of the mesh data path.

Example 158 includes the subject matter of any one of Examples 151-157, and optionally, wherein the instructions, when executed, cause the first NAN device to provide to a mesh data engine a mesh data path request indication comprising the source address of the mesh data path and the destination address of the mesh data path, and to generate the NAN data path request to the third NAN device based on a mesh data path request from the mesh data engine, the mesh data path request comprising an address of the third NAN device.

Example 159 includes the subject matter of Example 158, and optionally, wherein the instructions, when executed, cause the first NAN device to generate the mesh data path request based on routing information defining a routing path of the mesh data path.

Example 160 includes the subject matter of any one of Examples 147-159, and optionally, wherein the instructions, when executed, cause the first NAN device to set the path status indicator in the second path information attribute to indicate the mesh data path routing to the destination address of the mesh data path is not successful, when a third NAN device, which is subsequent to the first NAN device along a routing path of the mesh data path, cannot be reached.

Example 161 includes the subject matter of any one of Examples 147-160, and optionally, wherein the first and second path information attributes comprise a path identifier (ID) corresponding to the mesh data path.

Example 162 includes the subject matter of any one of Examples 147-161, and optionally, wherein the instructions, when executed, cause the first NAN device to process a keep-alive message from the second NAN device to indicate that the mesh data path is to be maintained.

Example 163 includes the subject matter of any one of Examples 147-162, and optionally, wherein the instructions, when executed, cause the first NAN device to transmit to the second NAN device a data path termination message to terminate the mesh data path.

Example 164 includes the subject matter of Example 163, and optionally, wherein the instructions, when executed, cause the first NAN device to transmit the termination message, when the mesh data path is idle for a time period longer than a termination threshold period.

Example 165 includes the subject matter of any one of Examples 147-164, and optionally, wherein the first and second path information attributes comprise first and second Path Specific Information attributes.

Example 166 includes an apparatus of wireless communication by a first Neighbor Awareness Networking (NAN) device, the apparatus comprising means for processing a NAN data path request from a second NAN device to request to establish a NAN data path between the first NAN device and the second NAN device, the NAN data path request comprising a first path information attribute corresponding to a mesh data path, the first path information attribute comprising a source address of the mesh data path and a destination address of the mesh data path; and means for transmitting a NAN data path response to the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing to the destination address of the mesh data path is successful.

Example 167 includes the subject matter of Example 166, and optionally, comprising means for selecting whether to complete establishing the NAN data path between the first NAN device and the second NAN device based at least on whether the mesh data path routing to the destination address of the mesh data path is successful.

Example 168 includes the subject matter of Example 167, and optionally, comprising means for completing establishing the NAN data path between the first NAN device and the second NAN device, only when the mesh data path routing to the destination address of the mesh data path is successful.

Example 169 includes the subject matter of Example 167 or 168, and optionally, comprising means for terminating establishing the NAN data path between the first NAN device and the second NAN device, when the mesh data path routing to the destination address of the mesh data path is not successful.

Example 170 includes the subject matter of any one of Examples 166-169, and optionally, comprising means for transmitting a NAN data path request to a third NAN device, the NAN data path request to the third NAN device to request to establish a NAN data path between the first NAN device and the third NAN device, the NAN data path request to the third NAN device comprising a third path information attribute corresponding to the mesh data path, the third path information attribute comprising the source address of the mesh data path and the destination address of the mesh data path.

Example 171 includes the subject matter of Example 170, and optionally, comprising means for processing a NAN data path response from the third NAN device, the NAN data path response from the third NAN device comprising a fourth path information attribute corresponding to the mesh data path, the fourth path information attribute comprising the source address of the mesh data path, the destination address of the mesh data path, and the path status indicator to indicate whether the mesh data path routing to the destination address of the mesh data path is successful.

Example 172 includes the subject matter of Example 171, and optionally, comprising means for setting the path status indicator in the second path information attribute based on the path status indicator in the fourth path information attribute.

Example 173 includes the subject matter of Example 171 or 172, and optionally, comprising means for setting the path status indicator in the second path information attribute to indicate the mesh data path routing to the destination address of the mesh data path is successful, when the path status indicator in the fourth path information attribute is to indicate the mesh data path routing to the destination address of the mesh data path is successful.

Example 174 includes the subject matter of any one of Examples 171-173, and optionally, comprising means for setting the path status indicator in the second path information attribute to indicate the mesh data path routing to the destination address of the mesh data path is not successful, when the path status indicator in the fourth path information attribute is to indicate the mesh data path routing to the destination address of the mesh data path is not successful.

Example 175 includes the subject matter of any one of Examples 170-174, and optionally, comprising means for setting the path status indicator in the second path information attribute to indicate the mesh data path routing to the destination address of the mesh data path is not successful, when a NAN data path response from the third NAN device is not received.

Example 176 includes the subject matter of any one of Examples 170-175, and optionally, comprising means for determining an address of the third NAN device based on routing information corresponding to the destination address of the mesh data path.

Example 177 includes the subject matter of any one of Examples 170-176, and optionally, comprising means for providing to a mesh data engine a mesh data path request indication comprising the source address of the mesh data path and the destination address of the mesh data path, and generating the NAN data path request to the third NAN device based on a mesh data path request from the mesh data engine, the mesh data path request comprising an address of the third NAN device.

Example 178 includes the subject matter of Example 177, and optionally, comprising means for generating the mesh data path request based on routing information defining a routing path of the mesh data path.

Example 179 includes the subject matter of any one of Examples 166-178, and optionally, comprising means for setting the path status indicator in the second path information attribute to indicate the mesh data path routing to the destination address of the mesh data path is not successful, when a third NAN device, which is subsequent to the first NAN device along a routing path of the mesh data path, cannot be reached.

Example 180 includes the subject matter of any one of Examples 166-179, and optionally, wherein the first and second path information attributes comprise a path identifier (ID) corresponding to the mesh data path.

Example 181 includes the subject matter of any one of Examples 166-180, and optionally, comprising means for processing a keep-alive message from the second NAN device to indicate that the mesh data path is to be maintained.

Example 182 includes the subject matter of any one of Examples 166-181, and optionally, comprising means for transmitting to the second NAN device a data path termination message to terminate the mesh data path.

Example 183 includes the subject matter of Example 182, and optionally, comprising means for transmitting the termination message, when the mesh data path is idle for a time period longer than a termination threshold period.

Example 184 includes the subject matter of any one of Examples 166-183, and optionally, wherein the first and second path information attributes comprise first and second Path Specific Information attributes.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a first Neighbor Awareness Networking (NAN) device to:
   transmit a NAN data path request to a second NAN device to request to establish a NAN data path between the first NAN device and the second NAN device, the NAN data path request comprising a first path information attribute corresponding to a mesh data path comprising the first NAN device, the second NAN device, and at least a third NAN device, the first path information attribute comprising a source address of the mesh data path and a destination address of the mesh data path;
   process a NAN data path response from the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing over the entire mesh data path from the source address to the destination address of the mesh data path is successful; and
   select whether to complete establishing the NAN data path between the first NAN device and the second NAN device based at least on the path status indicator.

2. The apparatus of claim 1 configured to cause the first NAN device to complete establishing the NAN data path between the first NAN device and the second NAN device, only when the path status indicator is to indicate that the mesh data path routing over the entire mesh data path from the source address to the destination address of the mesh data path is successful.

3. The apparatus of claim 1 configured to cause the first NAN device to terminate establishing the NAN data path between the first NAN device and the second NAN device, when the path status indicator is to indicate that the mesh data path routing to the destination address of the mesh data path is not successful.

4. The apparatus of claim 1 configured to cause the first NAN device to transmit the NAN data path request to the second NAN device based on a NAN data path request from the third NAN device, the NAN data path request from the third NAN device to request to establish a NAN data path between the third NAN device and the first NAN device, the NAN data path request from the third NAN device comprising a third path information attribute corresponding to the mesh data path, the third path information attribute comprising the source address of the mesh data path and the destination address of the mesh data path.

5. The apparatus of claim 4 configured to cause the first NAN device to transmit a NAN data path response to the third NAN device, the NAN data path response to the third NAN device comprising a fourth path information attribute corresponding to the mesh data path, the fourth path information attribute comprising the source address of the mesh data path, the destination address of the mesh data path, and the path status indicator to indicate whether the mesh data path routing over the entire mesh data path from the source address to the destination address of the mesh data path is successful.

6. The apparatus of claim 5 configured to cause the first NAN device to set the path status indicator in the fourth path information attribute based on the path status indicator in the second path information attribute.

7. The apparatus of claim 5 configured to cause the first NAN device to set the path status indicator in the fourth path information attribute to indicate the mesh data path routing to the destination address of the mesh data path is not successful, when the second NAN device cannot be reached, or when the NAN data path response from the second NAN device is not received.

8. The apparatus of claim 1 configured to cause the first NAN device to determine an address of the second NAN device based on routing information corresponding to the destination address of the mesh data path.

9. The apparatus of claim 1, wherein the first and second path information attributes comprise a path identifier (ID) corresponding to the mesh data path.

10. The apparatus of claim 1 comprising a NAN data engine to generate the NAN data path request based on a mesh data path request from a mesh data engine, the mesh data path request comprising an address of the second NAN device.

11. The apparatus of claim 10 comprising the mesh data engine to generate the mesh data path request based on routing information defining a routing path of the mesh data path.

12. The apparatus of claim 1 configured to cause the first NAN device to transmit to the second NAN device a keep-alive message to indicate that the mesh data path is to be maintained.

13. The apparatus of claim 1 configured to cause the first NAN device to transmit to the second NAN device a data path termination message to terminate the mesh data path.

14. The apparatus of claim 1, wherein the first and second path information attributes comprise first and second Path Specific Information attributes.

15. The apparatus of claim 1 comprising one or more antennas, a processor, and a memory.

16. A product comprising one or more tangible computer-readable non-transitory storage media comprising computer-executable instructions operable to, when executed by at least one processor, enable the at least one processor to cause a first Neighbor Awareness Networking (NAN) device to:
    transmit a NAN data path request to a second NAN device to request to establish a NAN data path between the first NAN device and the second NAN device, the NAN data path request comprising a first path information attribute corresponding to a mesh data path comprising the first NAN device, the second NAN device, and at least a third NAN device, the first path information attribute comprising a source address of the mesh data path and a destination address of the mesh data path;
    process a NAN data path response from the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing over the entire mesh data path from the source address to the destination address of the mesh data path is successful; and
    select whether to complete establishing the NAN data path between the first NAN device and the second NAN device based at least on the path status indicator.

17. The product of claim 16, wherein the instructions, when executed, cause the first NAN device to transmit the NAN data path request to the second NAN device based on a NAN data path request from the third NAN device, the NAN data path request from the third NAN device to request to establish a NAN data path between the third NAN device and the first NAN device, the NAN data path request from the third NAN device comprising a third path information attribute corresponding to the mesh data path, the third path information attribute comprising the source address of the mesh data path and the destination address of the mesh data path.

18. An apparatus comprising logic and circuitry configured to cause a first Neighbor Awareness Networking (NAN) device to:
    process a NAN data path request from a second NAN device to request to establish a NAN data path between the first NAN device and the second NAN device, the NAN data path request comprising a first path information attribute corresponding to a mesh data path comprising the first NAN device, the second NAN device, and at least a third NAN device, the first path information attribute comprising a source address of the mesh data path and a destination address of the mesh data path; and
    transmit a NAN data path response to the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing over the entire mesh data path from the source address to the destination address of the mesh data path is successful.

19. The apparatus of claim 18 configured to cause the first NAN device to select whether to complete establishing the NAN data path between the first NAN device and the second NAN device based at least on whether the mesh data path routing over the entire mesh data path from the source address to the destination address of the mesh data path is successful.

20. The apparatus of claim 18 configured to cause the first NAN device to transmit a NAN data path request to the third NAN device, the NAN data path request to the third NAN device to request to establish a NAN data path between the first NAN device and the third NAN device, the NAN data path request to the third NAN device comprising a third path information attribute corresponding to the mesh data path, the third path information attribute comprising the source address of the mesh data path and the destination address of the mesh data path.

21. The apparatus of claim 20 configured to cause the first NAN device to process a NAN data path response from the third NAN device, the NAN data path response from the third NAN device comprising a fourth path information attribute corresponding to the mesh data path, the fourth path information attribute comprising the source address of the mesh data path, the destination address of the mesh data path, and the path status indicator to indicate whether the mesh data path routing over the entire mesh data path from the source address to the destination address of the mesh data path is successful.

22. The apparatus of claim 21 configured to cause the first NAN device to set the path status indicator in the second path information attribute based on the path status indicator in the fourth path information attribute.

23. The apparatus of claim 18 comprising one or more antennas, a processor, and a memory.

24. A product comprising one or more tangible computer-readable non-transitory storage media comprising computer-executable instructions operable to, when executed by at least one processor, enable the at least one processor to cause a first Neighbor Awareness Networking (NAN) device to:
   process a NAN data path request from a second NAN device to request to establish a NAN data path between the first NAN device and the second NAN device, the NAN data path request comprising a first path information attribute corresponding to a mesh data path comprising the first NAN device, the second NAN device, and at least a third NAN device, the first path information attribute comprising a source address of the mesh data path and a destination address of the mesh data path; and
   transmit a NAN data path response to the second NAN device, the NAN data path response comprising a second path information attribute corresponding to the mesh data path, the second path information attribute comprising the source address of the mesh data path, the destination address of the mesh data path, and a path status indicator, the path status indicator to indicate whether mesh data path routing over the entire mesh data path from the source address to the destination address of the mesh data path is successful.

25. The product of claim 24, wherein the instructions, when executed, cause the first NAN device to select whether to complete establishing the NAN data path between the first NAN device and the second NAN device based at least on whether the mesh data path routing over the entire mesh data path from the source address to the destination address of the mesh data path is successful.

* * * * *